(12) United States Patent
Sugawara et al.

(10) Patent No.: US 11,601,621 B2
(45) Date of Patent: Mar. 7, 2023

(54) VEHICULAR DISPLAY SYSTEM

(71) Applicant: MAZDA MOTOR CORPORATION, Hiroshima (JP)

(72) Inventors: Daichi Sugawara, Hiroshima (JP); Koichi Murata, Hiroshima (JP); Erika Hori, Hiroshima (JP); Tomonori Ohtsubo, Hiroshima (JP); Yoshiaki Matsuba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/469,606

(22) Filed: Sep. 8, 2021

(65) Prior Publication Data

US 2022/0086400 A1 Mar. 17, 2022

(30) Foreign Application Priority Data

Sep. 15, 2020 (JP) .............................. JP2020-154280

(51) Int. Cl.
*H04N 7/18* (2006.01)
*B60R 1/00* (2022.01)
(Continued)

(52) U.S. Cl.
CPC .............. *H04N 7/181* (2013.01); *B60R 1/00* (2013.01); *G06T 11/00* (2013.01); *H04N 5/247* (2013.01); *B60R 2300/105* (2013.01); *B60R 2300/20* (2013.01); *B60R 2300/80* (2013.01); *H04N 5/23238* (2013.01)

(58) Field of Classification Search
CPC ........ H04N 5/217; H04N 5/222; H04N 5/225; H04N 7/181; H04N 5/247; H04N 5/23238; B60R 1/00; B60R 2300/105; B60R 2300/20; B60R 2300/80; B60R 2300/303; B60R 2300/602; B60R 2300/70;
(Continued)

(56) References Cited

U.S. PATENT DOCUMENTS 8,886,023 B2 * 11/2014 Satoh ...................... G06T 11/00
386/358
10,737,624 B2 * 8/2020 Kumon .................. G06V 40/19
(Continued)

FOREIGN PATENT DOCUMENTS

JP 2014-197818 A 10/2014

*Primary Examiner* — Brian P Yenke
*Assistant Examiner* — Humam M Satti
(74) *Attorney, Agent, or Firm* — Studebaker & Brackett PC

(57) ABSTRACT

A vehicular display system shows a view image including a blind area with superior visibility. Embodiments include an imaging unit that captures an image of a surrounding area of a vehicle; an image processing unit that converts the image into a view image of the surrounding area of the vehicle seen from inside a cabin; and a display unit. The image processing unit generates a rear-view image acquired when an area behind the vehicle is seen from a first virtual viewpoint located in the cabin, and a front-view image acquired when an area in front of the vehicle is seen from a second virtual viewpoint located behind the first virtual viewpoint in the cabin. The display unit shows the rear-view image when the vehicle travels backward, the front-view image when the vehicle travels forward, and shows both of the view images at substantially the same angle of view.

6 Claims, 16 Drawing Sheets

(51) Int. Cl.
*G06T 11/00* (2006.01)
*H04N 5/247* (2006.01)
*H04N 5/232* (2006.01)

(58) Field of Classification Search
CPC ........ B60R 2300/802; B60R 2300/207; B60R 2300/804; G06T 11/00
See application file for complete search history.

(56) References Cited

U.S. PATENT DOCUMENTS

| | | | |
|---|---|---|---|
| 2012/0105642 A1* | 5/2012 | Nojiri | G06V 20/56 348/148 |
| 2014/0292805 A1 | 10/2014 | Yamada et al. | |
| 2017/0108873 A1* | 4/2017 | Tanaka | G05D 1/0238 |
| 2022/0078390 A1* | 3/2022 | Jingu | G06T 15/20 |

\* cited by examiner

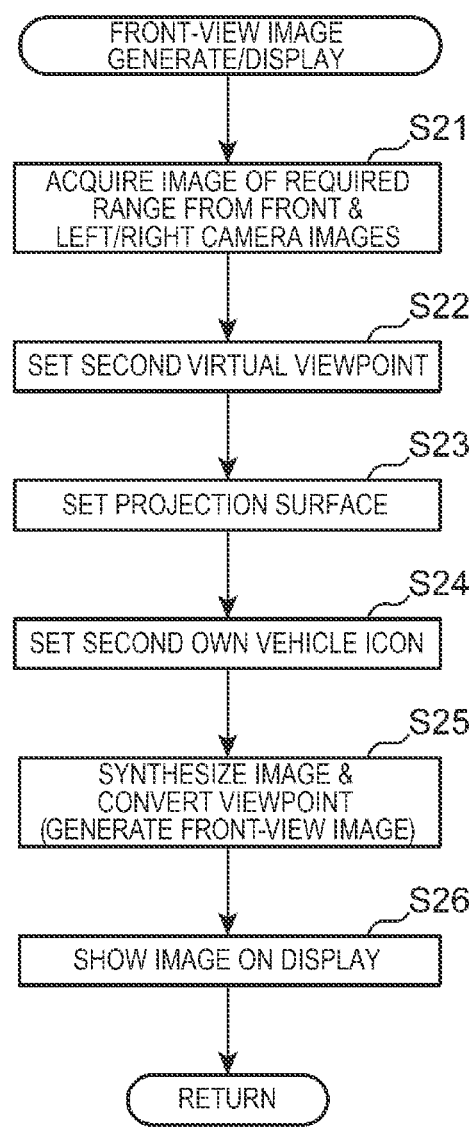

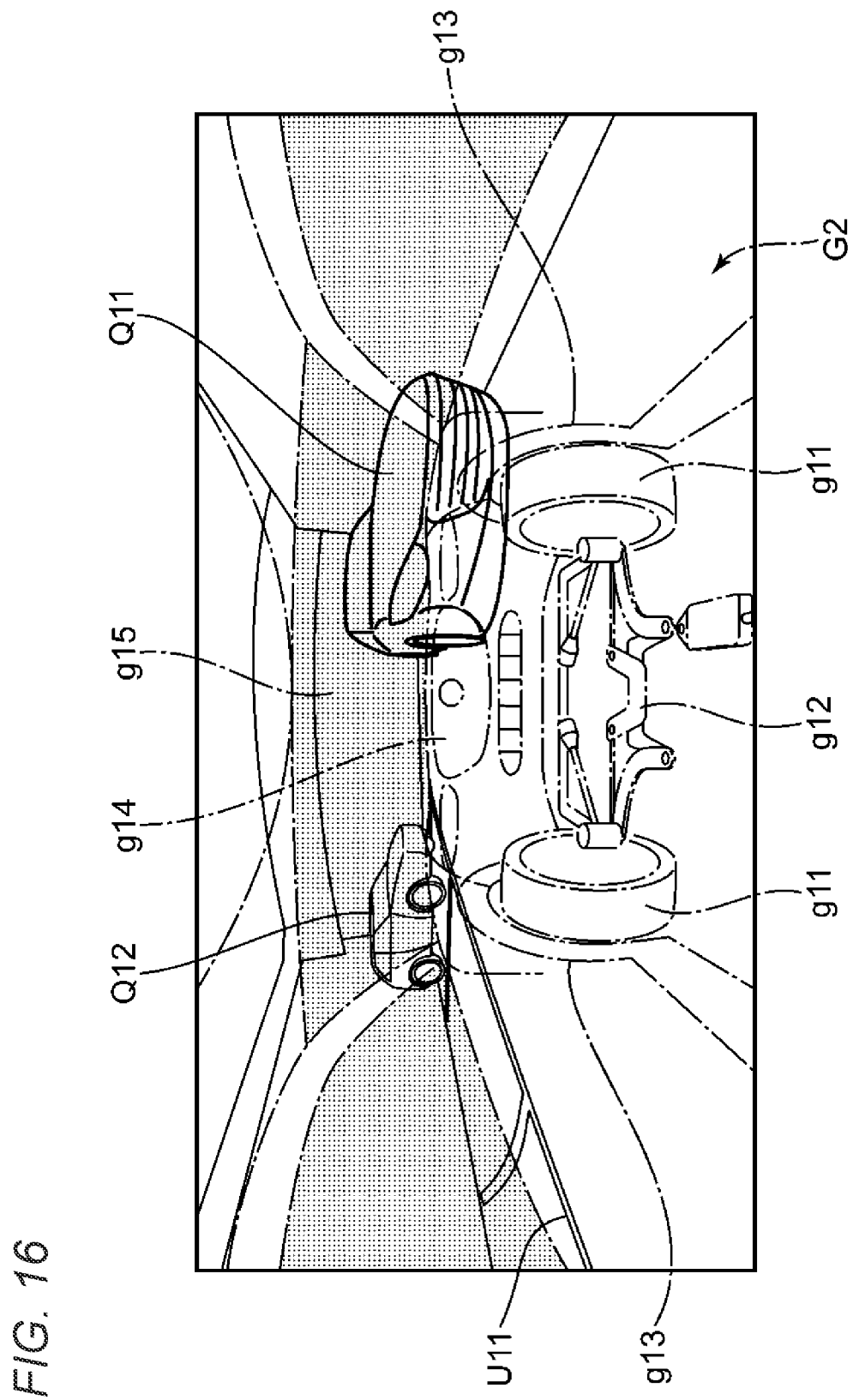

a vehicular display system that is mounted on a
vehicle to show an image of a surrounding area of a vehicle.

BACKGROUND ART

An example of the above vehicular display system has been disclosed in Japanese Patent Document JP-A-2014-197818. The vehicular display system in JP-A-2014-197818 includes: plural cameras, each of which captures an image of a surrounding area of a vehicle; an image processor that generates a composite image generated by combining and processing images included in a particular viewing angle from the images captured by the plural cameras; and a display device that shows the composite image generated by the image processor. The image processor generates, as the composite image, an image that is generated by superimposing a surrounding area image and a cabin image, and causes the display device to show the generated composite image. The surrounding area image shows a surrounding area of the vehicle that is seen from a specified virtual viewpoint, and the cabin image shows various components (for example, a dashboard, a pillar, and the like) in a cabin in a transmissive state.

The vehicular display system in JP-A-2014-197818 as described above can recognize information relating to an obstacle and the like around the vehicle in which it is installed while comprehending a positional relationship with the vehicle.

In JP-A-2014-197818, one of a composite image where a viewing direction is set to a vehicle front direction (hereinafter referred to as a front-view image) and a composite image where the viewing direction is set to a vehicle rear direction (hereinafter referred to as a rear-view image) is selectively shown according to a driver's operation. The virtual viewpoint at the time of generating the front-view image and the virtual viewpoint at the time of generating the rear-view image are set at a position of the driver's seat.

However, where each of the front-view image and the rear-view image is generated with the virtual viewpoint fixedly set at the position of the driver's seat, as described above, being a reference, there is a possibility that an area (a blind area) near left and right sides of the front portion of the vehicle or the rear portion of the vehicle cannot sufficiently be shown in at least one of the view images, and such an area is possibly a blind spot for the driver. In this case, it is possible to appropriately expand an angle of view of each of the front-view image and the rear-view image, to sufficiently show the blind area. However, in the case where the angles of view of the two view images consequently differ from each other, the driver feels a sense of discomfort at the time when the view image is switched from the rear-view image to the front-view image (or vice versa), for example. Thus, there is a possibility of degraded visibility of the image after it is switched.

SUMMARY

The present disclosure has been made in view of circumstances as described above and therefore has a purpose of providing a vehicular display system capable of showing a view image of a necessary and sufficient range including a blind area in a mode with superior visibility.

In order to solve the above problem, the present disclosure provides a vehicular display system that is mounted on a vehicle to show an image of a surrounding area of a vehicle, and includes: an imaging unit that captures the image of the surrounding area of the vehicle; an image processing unit that converts the image captured by the imaging unit into a view image that is an image of the surrounding area of the vehicle seen from inside of a cabin; and a display unit that shows the view image generated by the image processing unit. The image processing unit can generate, as the view image, a rear-view image and a front-view image, the rear-view image being acquired when an area behind the vehicle is seen from a first virtual viewpoint located in the cabin, and the front-view image being acquired when an area in front of the vehicle is seen from a second virtual viewpoint that is located behind the first virtual viewpoint in the cabin. The display unit shows the rear-view image when the vehicle travels backward, shows the front-view image when the vehicle travels forward, and shows both of the view images at substantially the same angle of view.

According to the present disclosure, when the vehicle travels backward, the display unit shows the rear-view image as an image acquired when the area behind the vehicle is seen from the first virtual viewpoint, which is located relatively on a front side in the cabin. Accordingly, it is possible to acquire, as the rear-view image, such an image that the area behind the vehicle is seen from a far position in a bird's-eye view, and it is possible to show a necessary and sufficient range that includes a blind area existing near each of left and right sides of a rear portion of the vehicle by the rear-view image. In this way, in a scene where a collision of the vehicle during reverse travel with an obstacle (such as another vehicle, a pedestrian, or the like) is concerned, such as when a driver performs a driving operation of the vehicle for reverse parking, the driver can accurately recognize the obstacle, which the driver is likely to miss, in a rear lateral area (a blind area) of the vehicle. Thus, it is possible to assist the driver to perform safe driving capable of avoiding the collision (involvement) with such an obstacle.

Similarly, when the vehicle travels forward, the display unit shows the front-view image as an image acquired when the area in front of the vehicle is seen from the second virtual viewpoint, which is located relatively on a rear side in the cabin. Accordingly, it is possible to acquire, as the front-view image, such an image that the area in front of the vehicle is seen from the far position in a bird's-eye view, and it is possible to show a necessary and sufficient range that includes a blind area existing near each of left and right sides of a front portion of the vehicle by the front-view image. In this way, in a scene where the collision of the vehicle during forward travel with the obstacle (such as another vehicle, a pedestrian, or the like) is concerned, such as when the driver performs a driving operation of the vehicle for forward parking, the driver can accurately recognize the obstacle, which the driver is likely to miss, in a front lateral area (the blind area) of the vehicle. Thus, it is possible to assist the driver to perform safe driving capable of avoiding the collision (the involvement) with such an obstacle.

In addition, since the angles of view of the rear-view image and the front-view image are set to be substantially the same, it is possible to favorably secure visibility of both of the view images. For example, in the case where the angle of view significantly differs between the rear-view image and the front-view image, the driver feels a sense of discomfort when the view image is switched from the rear-view image to the front-view image (or vice versa), and thus the driver may not understand the image after switching instantaneously. On the contrary, according to the present disclosure in which the angles of view of the rear-view image and the front-view image are substantially the same, it is possible to avoid generation of the sense of discomfort, just as described, and thus to make the driver instantaneously understand each of the view images.

Preferably, the first virtual viewpoint is a position above and in front of an eyepoint of a driver who is seated on a driver's seat, and the second virtual viewpoint is a position above and behind the driver's eyepoint.

With such a configuration, it is possible to show each of the rear-view image and the front-view image in a direction close to a direction of the driver's eye line. Thus, the driver can easily recognize each of the view images intuitively.

In the configuration, further preferably, in a side view, the first virtual viewpoint is set on a first inclined line that runs through a first target position on a road surface and the driver's eyepoint, the first target position being separated from a rear end of the vehicle by a braking distance during slow travel, and in the side view, the second virtual viewpoint is set on a second inclined line that runs through a second target position on the road surface and the driver's eyepoint, the second target position being separated from a front end of the vehicle by the braking distance during the slow travel.

With such a configuration, a similar image to an image that is shown when the driver actually changes a direction of the eye line to the first target position behind the vehicle is shown as the rear-view image. Accordingly, for example, when the driver performs the operation of the vehicle for the reverse parking, the driver can accurately recognize the obstacle at the first target position through the rear-view image. Similarly, a similar image to an image that is shown when the driver actually changes the direction of the eye line to the second target position in front of the vehicle is shown as the front-view image. Accordingly, for example, when the driver performs the operation of the vehicle for the forward parking, the driver can accurately recognize the obstacle at the second target position through the front-view image. It can be said that the first and second target positions, each of which is separated from the vehicle by the braking distance during the slow travel, are important positions to avoid the collision (positions where the driver should pay attention). Thus, when the driver accurately recognizes the obstacle existing at each of such first and second target positions, it is possible to reduce a possibility of the collision with the obstacle.

In the configuration, further preferably, the image processing unit generates the first view image or the second view image by projecting the image captured by the imaging unit on a predetermined virtual projection surface with the first virtual viewpoint or the second virtual viewpoint as a projection center, the projection surface has: a plane projection surface that is set on the road surface; and a stereoscopic projection surface that is elevated from an outer circumference of the plane projection surface, and the first target position and the second target position are set to be located near a lower edge of the stereoscopic projection surface.

In the case where the first target position and the second target position are set to be located near the lower edge of the stereoscopic projection surface (in other words, the outer circumference of the plane projection surface), just as described, the image of the obstacle can be shown in a state of being projected mainly on the stereoscopic projection surface at the time when the obstacle exists at each of the target positions. Compared to the plane projection surface, the stereoscopic projection surface produces slight distortion at the time of the projection. Accordingly, when the image of the obstacle on each of the target positions is mainly projected on the stereoscopic projection surface, it is possible to improve visibility of the obstacle. Thus, it is possible to further reduce the possibility of the collision with the obstacle.

Preferably, the image processing unit superimposes a first simulated image, which represents a group of components in a rear portion of the vehicle, on the rear-view image in a transmissive state and shows the first simulated image with the rear-view image, and superimposes a second simulated image, which represents a group of components in a front portion of the vehicle, on the front-view image in the transmissive state and shows the second simulated image with the front-view image. Preferably, the first simulated image includes an image of a component that defines an outermost contour of the rear portion of the vehicle, and the second simulated image includes an image of a component that defines an outermost contour of the front portion of the vehicle.

In the case where the first simulated image (the second simulated image), which represents the group of the components in the rear portion (the front portion) of the vehicle in the transmissive state, is superimposed on the rear-view image (the front-view image) and is shown therewith, just as described, the driver can recognize information on the obstacle, which is shown in each of the view images, and the like while comprehending a positional relationship with the vehicle. In addition, the first simulated image includes the image of the component that defines the outermost contour of the rear portion of the vehicle, and the second simulated image includes the image of the component that defines the outermost contour of the front portion of the vehicle. Accordingly, the driver can accurately recognize a positional relationship between the obstacle that exists in the rear lateral area or the front lateral area of the vehicle and the component having a possibly of being the first to collide with the obstacle. Thus, it is possible to further reduce the possibility of the collision with the obstacle.

As it has been described so far, the vehicular display system of the present disclosure can show the view image of the necessary and sufficient range including the blind area in a mode with the superior visibility.

BRIEF DESCRIPTION OF THE DRAWINGS

FIG. 8 is a subroutine illustrating details of front-view image generation/display control that is executed in step S8 of FIG. 6.

FIG. 16 is a view illustrating an example of the front-view image.

DETAILED DESCRIPTION

(1) Overall Configuration

Figure 1:
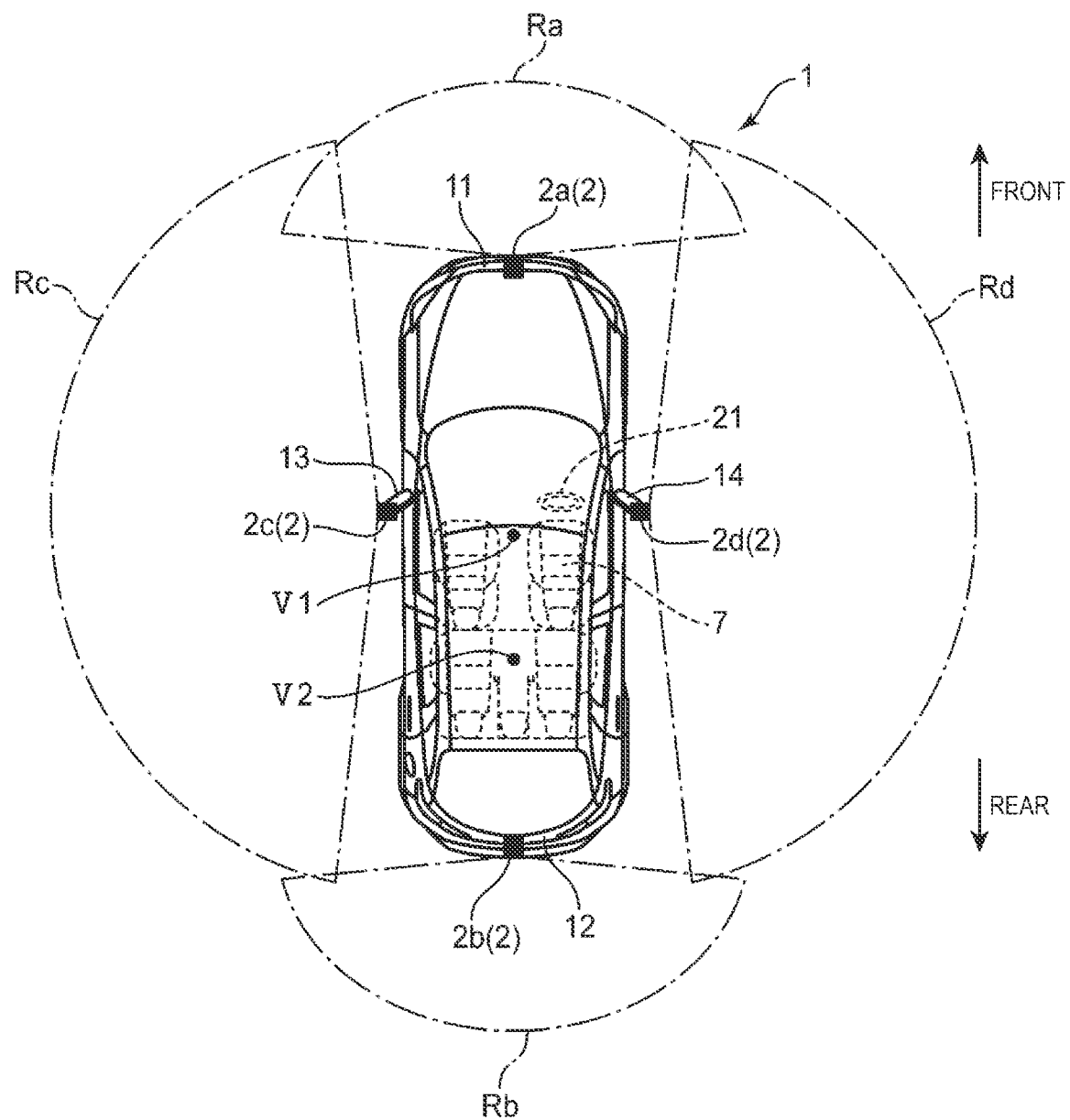
FIG. 1 is a plan view of a vehicle that includes a vehicular display system according to an embodiment of the present disclosure.
Figure 2:
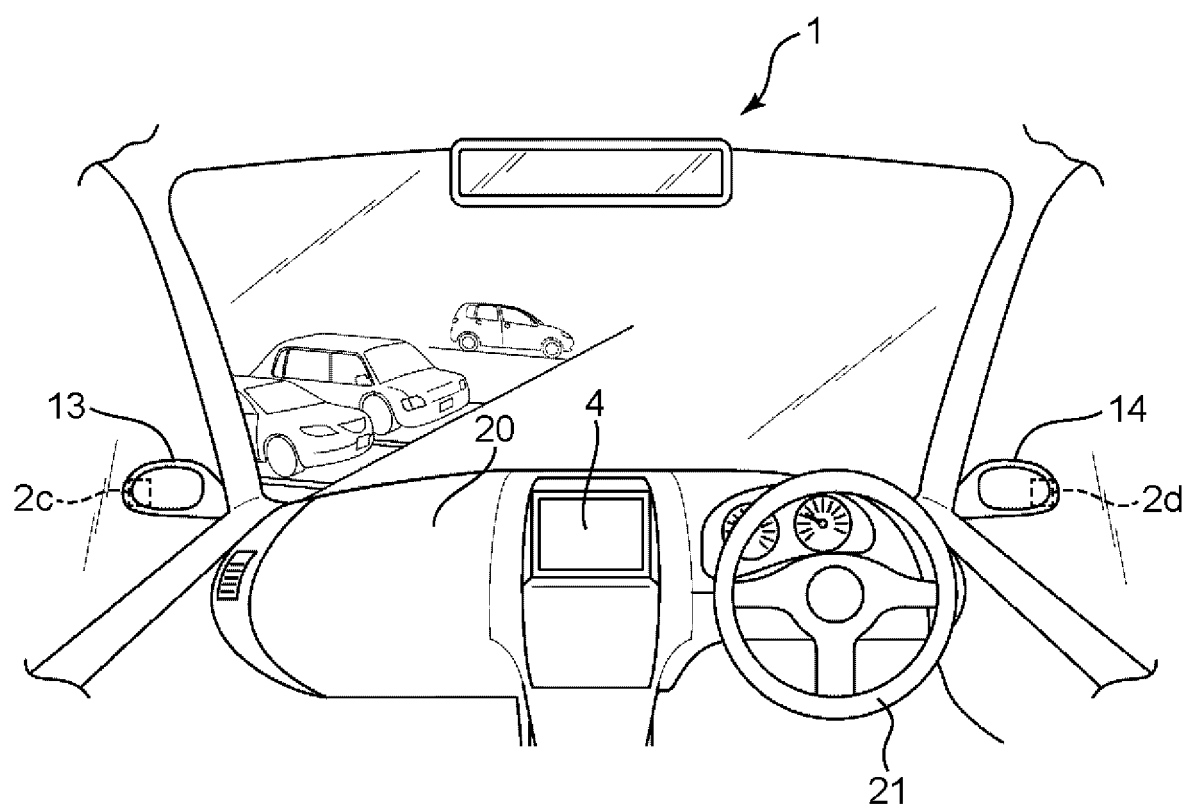
FIG. 2 is a perspective view in which a front portion of a cabin in the vehicle is seen from behind.
Figure 3:
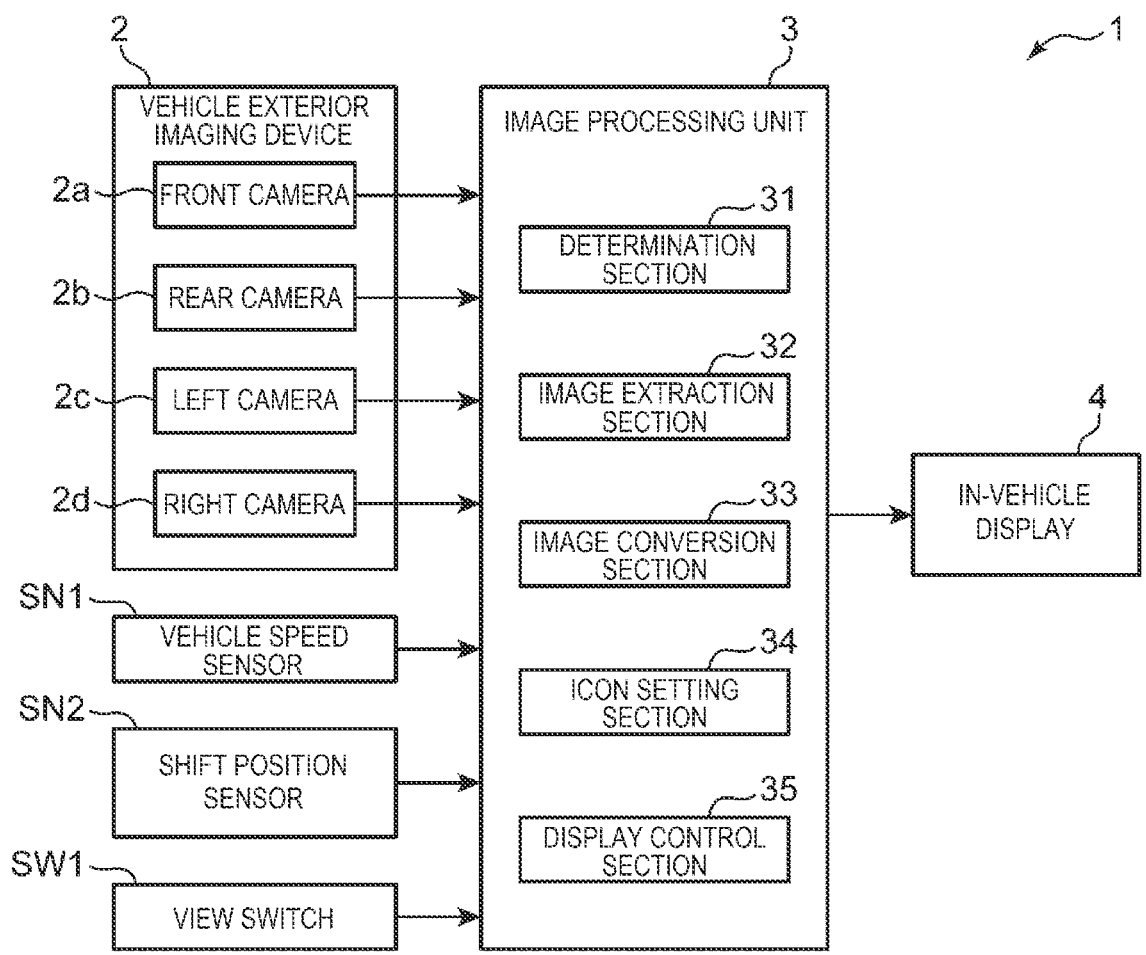
FIG. 3 is a block diagram illustrating a control system of the vehicular display system.

FIG. 1 is a plan view of a vehicle that includes a vehicular display system 1 (hereinafter referred to as a display system 1) according to an embodiment of the present disclosure, FIG. 2 is a perspective view illustrating a front portion of a cabin in the vehicle, and FIG. 3 is a block diagram illustrating a control system of the display system 1. As illustrated in FIG. 1, FIG. 2, and FIG. 3, the display system 1 includes: a vehicle exterior imaging device 2 (FIG. 1, FIG. 3) that captures an image of a surrounding area of the vehicle; an image processing unit 3 (FIG. 3) that executes various types of image processing on the image captured by the vehicle exterior imaging device 2; and an in-vehicle display 4 (FIG. 2, FIG. 3) that shows the image processed by the image processing unit 3. The vehicle exterior imaging device 2 corresponds to an example of the "imaging unit" in the present disclosure, and the in-vehicle display 4 corresponds to an example of the "display unit" of the present disclosure.

The vehicle exterior imaging device 2 includes: a front camera 2a that captures an image of an area in front of the vehicle; a rear camera 2b that captures an image of an area behind the vehicle; a left camera 2c that captures an image of an area on a left side of the vehicle; and a right camera 2d that captures an image of an area on a right side of the vehicle. As illustrated in FIG. 1, the front camera 2a is attached to a front face section 11 at a front end of the vehicle and is configured to be able to acquire an image within an angular range Ra in front of the vehicle. The rear camera 2b is attached to a rear surface of a hatchback 12 in a rear portion of the vehicle and is configured to be able to acquire an image within an angular range Rb behind the vehicle. The left camera 2c is attached to a side mirror 13 on the left side of the vehicle and is configured to be able to acquire an image within an angular range Rc on the left side of the vehicle. The right camera 2d is attached to a side mirror 14 on the right side of the vehicle and is configured to be able to acquire an image within an angular range Rd on the right side of the vehicle. Each of these front/rear/left/right cameras 2a to 2d is constructed of a camera with a fisheye lens and thus having a wide field of view.

The in-vehicle display 4 is arranged in a central portion of an instrument panel 20 (FIG. 2) in the front portion of the cabin. The in-vehicle display 4 is constructed of a full-color liquid-crystal panel, for example, and can show various screens according to an operation by an occupant or a travel state of the vehicle. More specifically, in addition to a function of showing the images captured by the vehicle exterior imaging device 2 (the cameras 2a to 2d), the in-vehicle display 4 has a function of showing, for example, a navigation screen that provides a travel route to a destination of the vehicle, a setting screen used to set various types of equipment provided in the vehicle, and the like. The illustrated vehicle is a right-hand drive vehicle, and a steering wheel 21 is arranged on a right side of the in-vehicle display 4. In addition, a driver's seat 7 (FIG. 1) as a seat, on which a driver who drives the vehicle is seated, is arranged behind the steering wheel 21.

The image processing unit 3 executes various types of the image processing on the images, each of which is captured by the vehicle exterior imaging device 2 (the cameras 2a to 2d), to generate an image that is acquired when the surrounding area of the vehicle is seen from the inside of the cabin (hereinafter referred to as a view image), and causes the in-vehicle display 4 to show the generated view image. Although details will be described below, the image processing unit 3 generates one of a rear-view image and a front-view image according to a condition and causes the in-vehicle display 4 to show the generated view image. The rear-view image is an image that acquired when the area behind the vehicle is seen from the inside of the cabin. The front-view image is the image that is acquired when the area in front of the vehicle is seen from the inside of the cabin.

As illustrated in FIG. 3, a vehicle speed sensor SN1, a shift position sensor SN2, and a view switch SW1 are electrically connected to the image processing unit 3.

The vehicle speed sensor SN1 is a sensor that detects a travel speed of the vehicle.

The shift position sensor SN2 is a sensor that detects a shift position of an automatic transmission (not illustrated) provided in the vehicle. The automatic transmission can achieve at least four shift positions of drive (D), neutral (N), reverse (R), and parking (P), and the shift position sensor SN2 detects whether any of these positions is achieved. The D-position is the shift position that is selected when the vehicle travels forward (a forward range), the R-position is the shift position that is selected when the vehicle travels backward (a backward range), and each of the positions of N, P is the shift position that is selected when the vehicle does not travel.

The view switch SW1 is a switch that is used to determine whether to permit display of the view image when the shift position is the D-position (that is, when the vehicle travels forward). Although details will be described below, in this embodiment, the in-vehicle display 4 automatically shows the rear-view image when the shift position is the R-position (the backward range). Meanwhile, in the case where the shift position is the D-position (the forward range), the in-vehicle display 4 shows the front-view image only when the view switch SW1 is operated (that is, when the driver makes a request). According to an operation status of the view switch SW1 and a detection result by the shift position sensor SN2, the image processing unit 3 determines whether one of the front-view/rear-view images is shown on the in-vehicle display 4 or none of the front-view/rear-view images is shown on the in-vehicle display 4. The view switch SW1 can be provided to the steering wheel 21, for example.

(2) Details of Image Processing Unit

A further detailed description will be made on a configuration of the image processing unit 3. As illustrated in FIG. 3, the image processing unit 3 functionally has a determination section 31, an image extraction section 32, an image conversion section 33, an icon setting section 34, and a display control section 35.

The determination section 31 is a module that makes various necessary determinations for execution of the image processing.

The image extraction section 32 is a module that executes processing to extract the images captured by the front/rear/left/right cameras 2a to 2d within a required range. More specifically, the image extraction section 32 switches the cameras to be used according to whether the vehicle travels forward or backward. For example, when the vehicle travels backward (when the shift position is in an R range), the plural cameras including at least the rear camera 2b are used. When the vehicle travels forward (when the shift position is in a D range), the plural cameras including at least the front camera 2a are used. A range of the image that is extracted from each of the cameras to be used is set to be a range that corresponds to an angle of view of the image (the view image, which will be described below) finally shown on the in-vehicle display 4.

Figure 4:
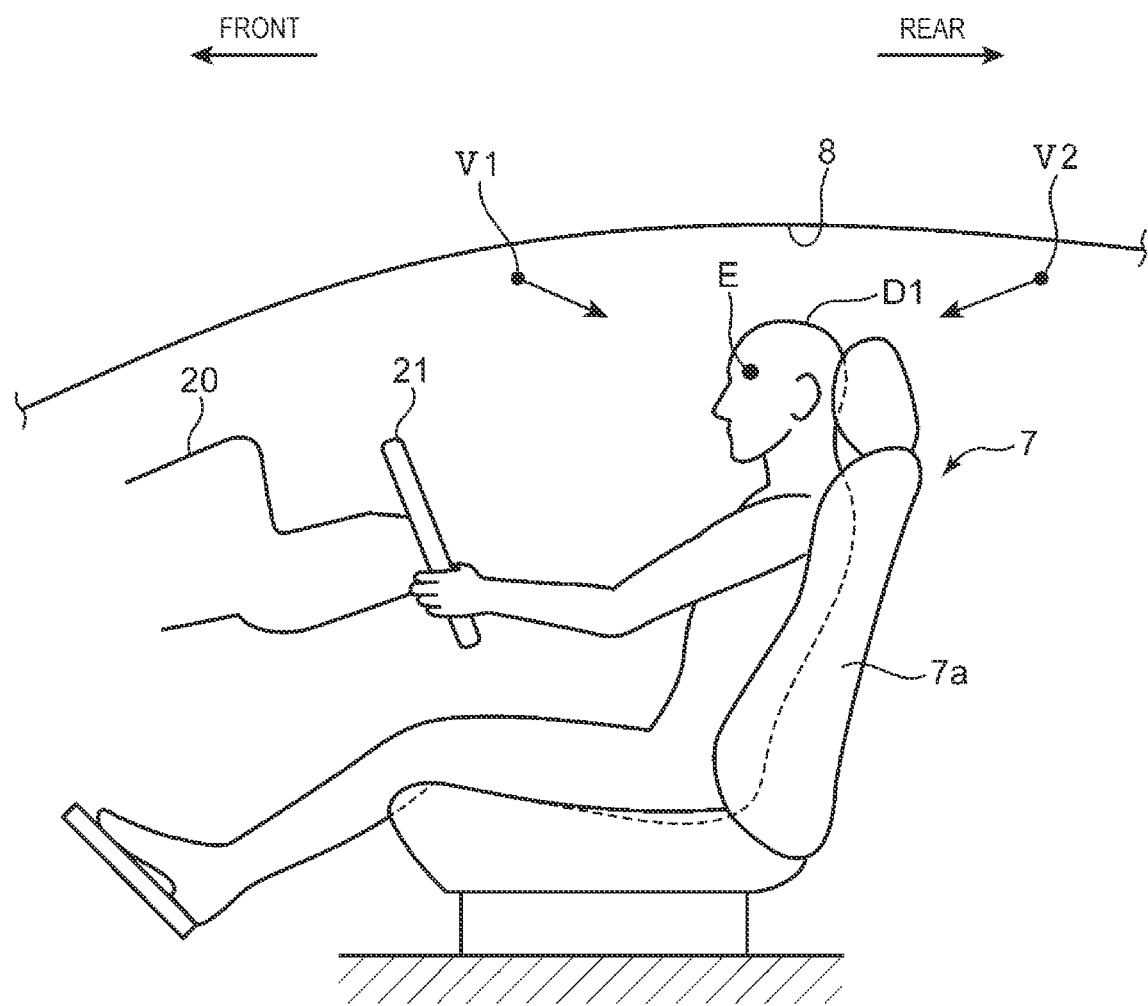
FIG. 4 is a side view in which the front portion of the cabin is seen from a side.
Figure 5:
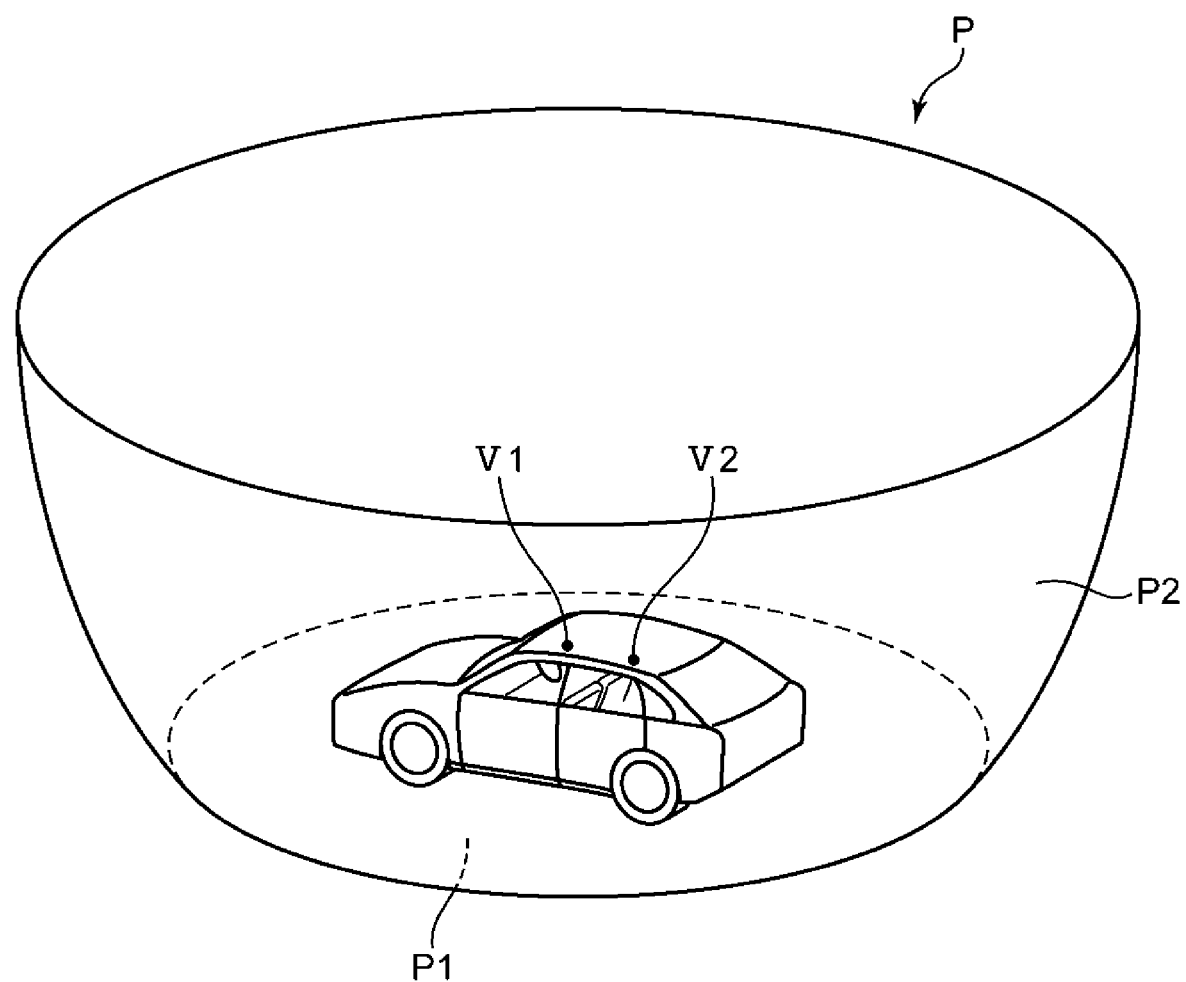
FIG. 5 is a perspective view illustrating virtual viewpoints (a first virtual viewpoint and a second virtual viewpoint) set in the cabin and a projection surface that is used when a view image that is seen from each of the virtual viewpoints is generated.

The image conversion section 33 is a module that executes viewpoint conversion processing while synthesizing the images, which are captured by the cameras and extracted by the image extraction section 32, so as to generate the view image that is the image of the surrounding area of the vehicle seen from the inside of the cabin. Upon conversion of the viewpoint, a projection surface P, which is illustrated in FIG. 5, and a first virtual viewpoint V1 and a second virtual viewpoint V2, which are illustrated in FIG. 1, FIG. 4, and FIG. 5, are used. The projection surface P is a bowl-shaped virtual surface and includes: a plane projection surface P1 that is set on a level road surface when it is assumed that the vehicle travels on such a road surface; and a stereoscopic projection surface P2 that is elevated from an outer circumference of the plane projection surface P1. The plane projection surface P1 is a circular projection surface with a diameter capable of surrounding the vehicle. The stereoscopic projection surface P2 is formed to be expanded upward as a diameter thereof is increased upward (as separating from the outer circumference of the plane projection surface P1). Each of the first virtual viewpoint V1 and the second virtual viewpoint V2 (FIG. 1, FIG. 4) is a point that serves as a projection center when the view image is projected to the projection surface P, and each thereof is set in the cabin. The first virtual viewpoint V1 is located in front of the second virtual viewpoint V2. The image conversion section 33 converts the image, which is captured by each of the cameras and extracted, into the view image that is projected to the projection surface P with the first virtual viewpoint V1 or the second virtual viewpoint V2 as the projection center. The convertible view images at least include: the rear-view image that is a projection image in the case where the area behind the vehicle is seen from the first virtual viewpoint V1 (an image that is acquired by projecting the camera image to a rear area of the projection surface P); and the front-view image that is a projection image in the case where the area in front of the vehicle is seen from the second virtual viewpoint V2 (an image that is acquired by projecting the camera image to a front area of the projection surface P).

The icon setting section 34 is a module that executes processing to set a first vehicle icon G1 (FIG. 15) and a second vehicle icon G2 (FIG. 16) that are shown in a superimposed manner on the above view image (the rear-view image or the front-view image). The first vehicle icon G1 is a graphic image that shows various components (wheels and cabin components) of the vehicle in a transmissive state, and such components appear when the area behind the vehicle is seen from the first virtual viewpoint V1. The second vehicle icon G2 is a graphic image that shows various components of the vehicle in the transmissive state, and such components appear when the area in front of the vehicle is seen from the second virtual viewpoint V2. The first vehicle icon G1 is the "first simulated image" in the present disclosure, and the second vehicle icon G2 is the "second simulated image" in the present disclosure.

The display control section 35 is a module that executes processing to show the view image, on which the first or second vehicle icon G1, G2 is superimposed, on the in-vehicle display 4. That is, the display control section 35 superimposes the first vehicle icon G1, which is set by the icon setting section 34, on the rear-view image, which is generated by the image conversion section 33, and shows the superimposed view image on the in-vehicle display 4. Similarly, the display control section 35 superimposes the second vehicle icon G2, which is set by the icon setting section 34, on the front-view image, which is generated by the image conversion section 33, and shows the superimposed view image on the in-vehicle display 4.

(3) Control Operation

Figure 6:
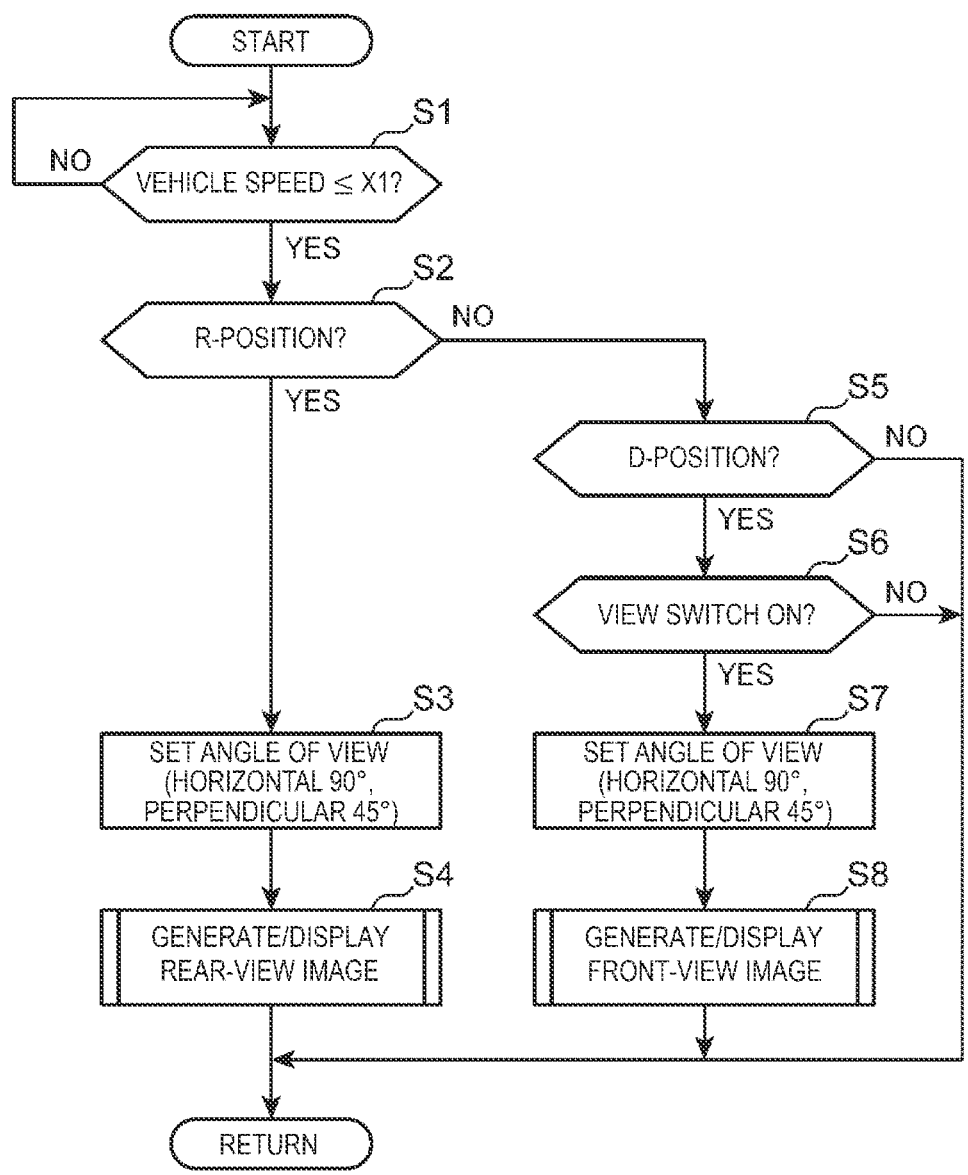
FIG. 6 is a flowchart illustrating contents of control that is executed by an image processing unit during driving of the vehicle.

FIG. 6 is a flowchart illustrating contents of control that is executed by the image processing unit 3 during driving of the vehicle. When the control illustrated in FIG. 6 is started, the image processing unit 3 (the determination section 31) determines whether the vehicle speed detected by the vehicle speed sensor SN1 is equal to or lower than a predetermined threshold speed X1 (step S1). The threshold speed X1 can be set to approximately 15 km/h, for example.

If it is determined YES in step S1 and it is thus confirmed that the vehicle speed is equal to or lower than the threshold speed X1, the image processing unit 3 (the determination section 31) determines whether the shift position detected by the shift position sensor SN2 is the R-position (the backward range) (step S2).

If it is determined YES in step S2 and it is thus confirmed that the shift position is the R-position (in other words, when the vehicle travels backward), the image processing unit 3 sets the angle of view of the rear-view image, which is generated in step S4 described below (step S3). More specifically, in this step S3, a horizontal angle of view is set to 90 degrees, and a perpendicular angle of view is set to 45 degrees.

Figure 9A:
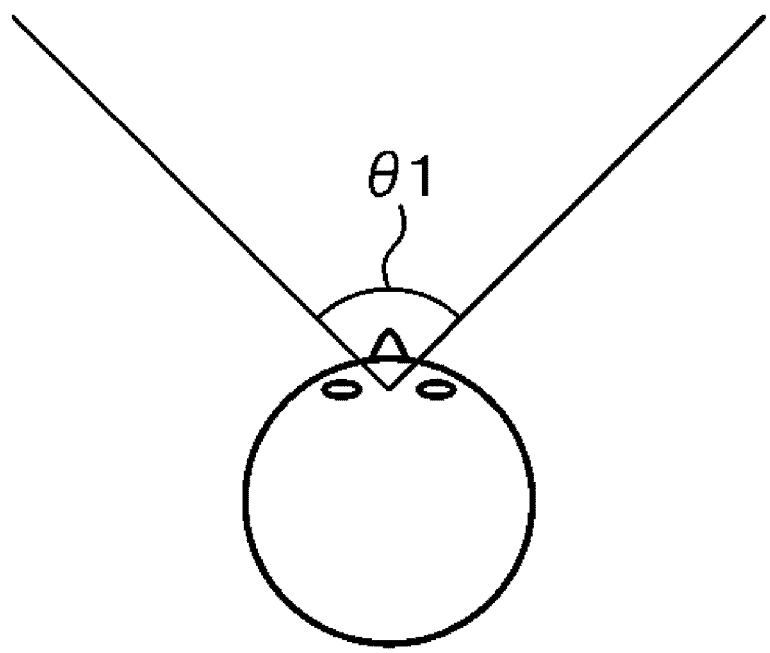
FIGS. 9A-B are views illustrating a stable visual field during gazing of a person, in which 9A is a plan view and 9B is a side view.
Figure 9B:
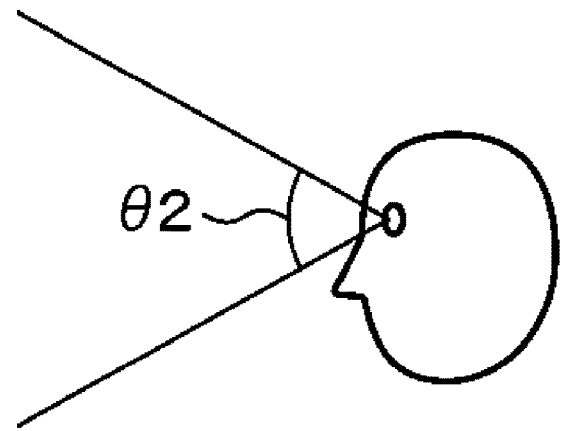

The angle of view, which is set in step S3, is based on a stable visual field during gazing of a person. The stable visual field during gazing means such a range that the person can visually recognize without difficulty due to assistance of head movement (cervical movement) with eye movement. In general, it is said that the stable visual field during gazing has an angular range between 45 degrees to the left and 45 degrees to the right in the horizontal direction and has an angular range between 30 degrees upward and 40 degrees downward in the perpendicular direction. That is, as illustrated in FIGS. 9A and 9B, when a maximum angle in the horizontal direction (a maximum horizontal angle) of the stable visual field during gazing is set as θ1, and a maximum angle in the perpendicular direction (a maximum perpendicular angle) of the stable visual field during gazing is set as θ2, the maximum horizontal angle θ1 is 90 degrees, and the maximum perpendicular angle θ2 is 70 degrees. In addition, it is said that an effective visual field having a horizontal angular range of 30 degrees and a perpendicular angular range of 20 degrees exists within the stable visual field during gazing, and thus information in this effective visual field can accurately be identified only with the eye movement. On the contrary, it is difficult to identify information on the outside of the effective visual field with a sufficient degree of accuracy even when such information is visible. Thus, it is difficult to notice a slight change that occurs to such information. The assistance of the head movement (the cervical movement) is necessary to visually recognize (gaze) the information on the outside of the effective visual field with the high degree of accuracy. Meanwhile, it is considered that, when the information is located on the outside of the effective visual field but within the stable visual field during gazing, it is possible to accurately identify such information only with the slight head movement without difficulty and to handle the slight change that occurs to such information relatively promptly.

In consideration of the above point, in this embodiment, the angle of view of the rear-view image is set to 90 degrees in the horizontal direction and 45 degrees in the perpendicular direction. That is, the horizontal angle of view of the rear-view image is set to 90 degrees, which is the same as the maximum horizontal angle θ1 of the stable visual field during gazing, and the perpendicular angle of view of the rear-view image is set to 45 degrees, which is smaller than the maximum perpendicular angle θ2 (=70 degrees) of the stable visual field during gazing.

Next, the image processing unit 3 executes control to generate the rear-view image, which is acquired when the area behind the vehicle is seen from the first virtual viewpoint V1 in the cabin, and show the rear-view image on the in-vehicle display 4 (step S4). Details of this control will be described below.

Next, a description will be made on control that is executed if it is determined NO in above step S2, that is, if the shift position of the automatic transmission is not the R-position (the backward range). In this case, the image processing unit 3 (the determination section 31) determines whether the shift position detected by the shift position sensor SN2 is the D-position (the forward range) (step S5).

If it is determined YES in step S5 and it is thus confirmed that the shift position is the D-position (in other words, when the vehicle travels forward), the image processing unit 3 (the determination section 31) determines whether the view switch SW1 is in an ON state on the basis of a signal from the view switch SW1 (step S6).

If it is determined YES in step S6 and it is thus confirmed that the view switch SW1 is in the ON state, the image processing unit 3 sets the angle of view of the front-view image, which is generated in step S8 described below (step S7). The angle of view of the front-view image, which is set in this step S7, is the same as the angle of view of the rear-view image, which is set in above-described step S3, and is set to 90 degrees in the horizontal direction and 45 degrees in the perpendicular direction in this embodiment.

Next, the image processing unit 3 executes control to generate the front-view image, which is acquired when the area in front of the vehicle is seen from the second virtual viewpoint V2 in the cabin, and show the front-view image on the in-vehicle display 4 (step S8). Details of this control will be described below.

Figure 7:
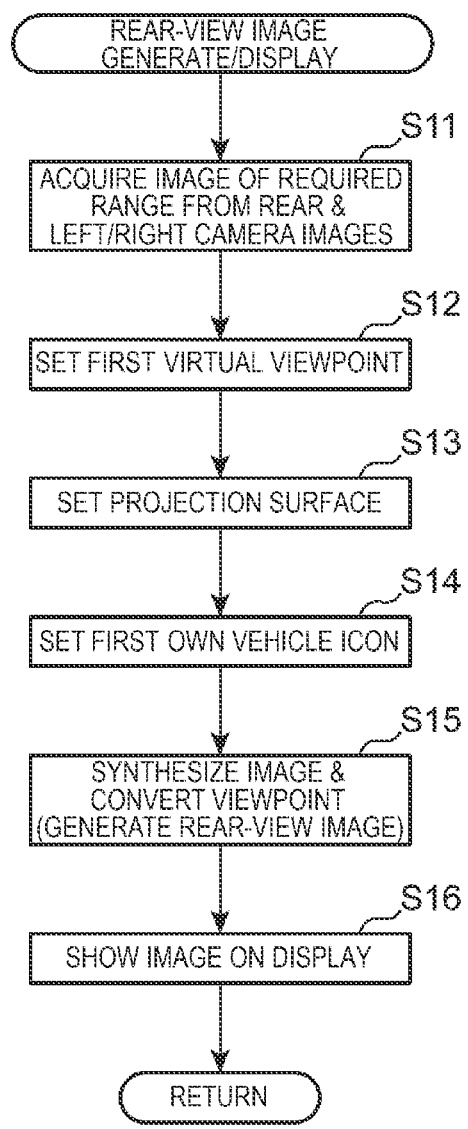
FIG. 7 is a subroutine illustrating details of rear-view image generation/display control that is executed in step S4 of FIG. 6.

FIG. 7 is a subroutine illustrating details of rear-view image generation/display control that is executed in above-described step S4. When the control illustrated in FIG. 7 is started, the image processing unit 3 (the image extraction section 32) acquires image data of the required range from the images captured by the rear camera 2b, the left camera 2c, and the right camera 2d (step S11).

Figure 10A:
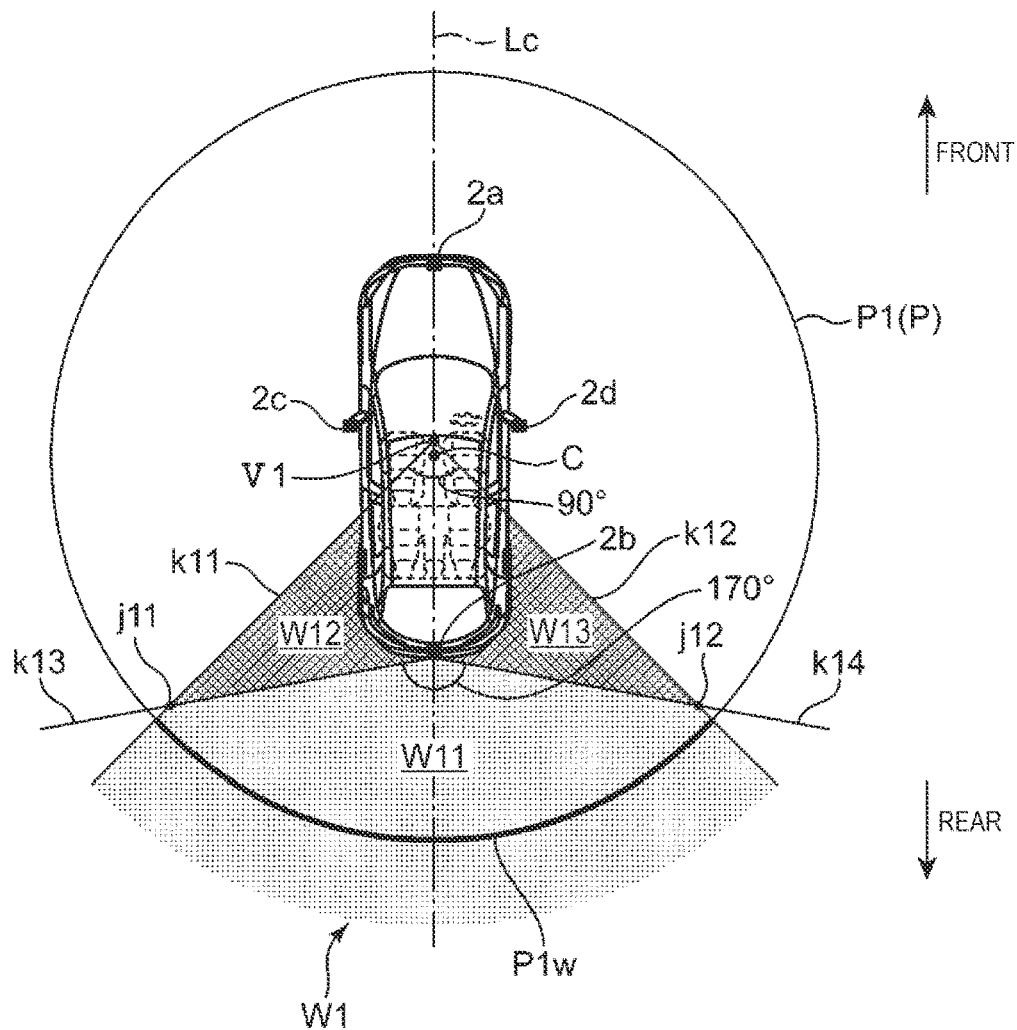
FIGS. 10A-B are views illustrating a range of image data that is used when the rear-view image is generated, in which 10A is a plan view and 10B is a side view.
Figure 10B:
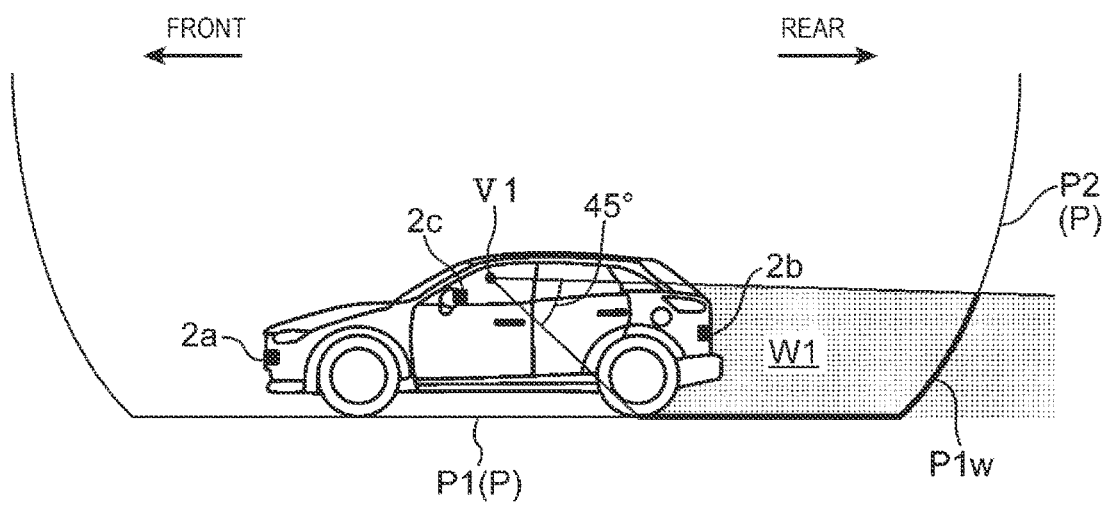

FIGS. 10A and 10B are schematic views for illustrating the range of the image data acquired in step S11, and illustrate the vehicle and the projection surface P therearound in a plan view and a side view, respectively. As it has already been described, the rear-view image is the image that is acquired by projecting the camera image to the rear area within the angular range of 90 degrees in the horizontal direction and 45 degrees in the perpendicular direction with the first virtual viewpoint V1 being the projection center. Accordingly, the image data that is required to acquire such a rear-view image is image data of an imaging area W1 in a three-dimensional fan shape that at least expands backward at angles of 90 degrees in the horizontal direction and 45 degrees in the perpendicular direction from the first virtual viewpoint V1. Thus, in step S11, data that corresponds to the image within the imaging area W1 is acquired from the data of each of the images captured by the rear camera 2b, the left camera 2c, and the right camera 2d.

A further detailed description will be made on this point. In this embodiment, as illustrated in FIG. 10A, the first virtual viewpoint V1 is set on a vehicle center axis Lc (an axis that passes through a vehicle center C and extends longitudinally), and an image that is acquired when the area behind is seen straight from this first virtual viewpoint V1 is generated as the rear-view image. Thus, in a plan view, the imaging area W1 is a fan-shaped area that expands backward with the horizontal angular range of 90 degrees (45 degrees each to the left and right of the vehicle center axis Lc) from the first virtual viewpoint V1, that is, a fan-shaped area that is defined by a first line k11 and a second line k12, the first line k11 extends backward to the left at an angle of 45 degrees from the first virtual viewpoint V1, and the second line k12 extends backward to the right at an angle of 45 degrees from the first virtual viewpoint V1. In order to acquire imaging data within such an imaging area W1, in above step S11, the imaging area W1 is divided into three areas W11 to W13 (FIG. 10A) in the plan view, and image data of the areas W11 to W13 is acquired from the different cameras. When the area W11, the area W12, the area W13 are set as a first area, a second area, and a third area, respectively, in this embodiment, image data of the first area W11 is acquired from the rear camera 2b, image data of the second area W12 is acquired from the left camera 2c, and image data of the third area W13 is acquired from the right camera 2d.

More specifically, of the above-described imaging area W1 (the area defined by the first line k11 and the second line k12), the first area W11 is an area overlapping a fan-shaped area that expands backward with a horizontal angular range of 170 degrees (85 degrees each to the left and right of the vehicle center axis Lc) from the rear camera 2b. In other words, the first area W11 is an area defined by a third line k13 that extends backward to the left at an angle of 85 degrees from the rear camera 2b, a fourth line k14 that extends backward to the right at an angle of 85 degrees from the rear camera 2b, a portion of the first line k11 that is located behind a point of intersection j11 with the third line k13, and a portion of the second line k12 that is located behind a point of intersection j12 with the fourth line k14. The second area W12 is a remaining area after the first area W11 is removed from a left half portion of the imaging area W1. The third area W13 is a remaining area after the first area W11 is removed from a right half portion of the imaging area W1. Of the second and third areas W12, W13, areas immediately behind the vehicle are areas, images of which cannot be captured by the left and right cameras 2c, 2d, respectively. However, the images of these areas are compensated by specified interpolation processing (for example, processing to stretch an image of an adjacent area to each of such areas).

After the image of the required range is acquired from each of the cameras 2b, 2c, 2d, just as described, the image processing unit 3 (the image conversion section 33) sets the first virtual viewpoint V1 that is used when the rear-view image is generated in step S15, which will be described below (step S12). As illustrated in FIG. 4 and FIG. 10A, the first virtual viewpoint V1 is set at a position included in the cabin and at a position that matches the vehicle center axis Lc in the plan view and is shifted to the front from the driver's head D1 in the side view.

Figure 11:
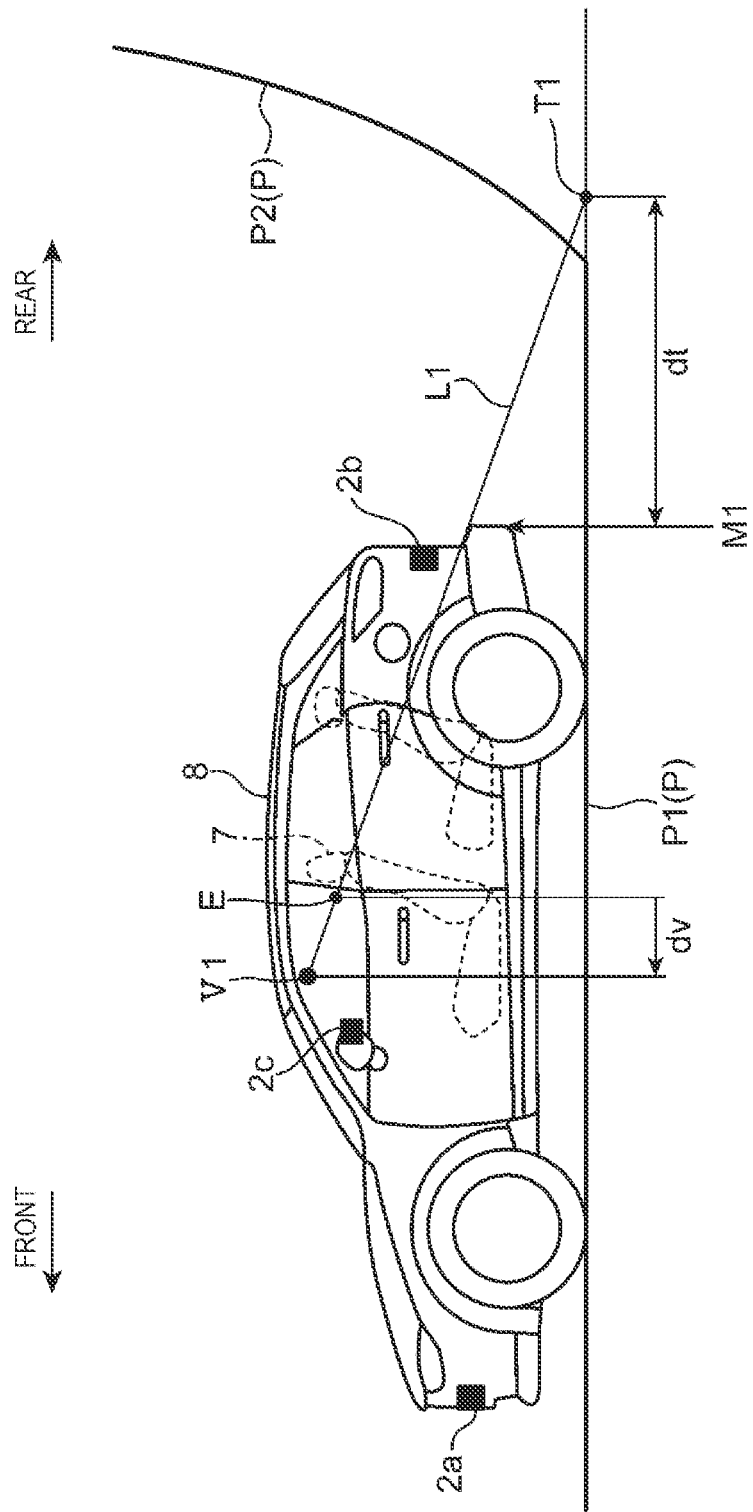
FIG. 11 is a side view for illustrating a position of the first virtual viewpoint that is used when the rear-view image is generated.

A description will be made on the detailed position of the first virtual viewpoint V1 with reference to FIG. 11. In FIG. 11, a point T1 is a point on the road surface (further precisely, on a virtual road surface that is made flush with the plane projection surface P1) that is separated from a rear end M1 of the vehicle by a distance dt, and this will hereinafter be referred to as a first target position. The distance dt from the rear end M1 of the vehicle to a first target position T1 corresponds to a braking distance during slow travel (when the vehicle speed is 5 km/h), that is, a moving distance of the vehicle from time at which the driver notices danger to time at which the vehicle is stopped by a brake operation, and is set to 2 m, for example. A point E in FIG. 11 (also illustrated in FIG. 4) is a position of eyes of the driver who is seated on the driver's seat 7, that is, an eyepoint. Here, it is assumed that the driver in this case has the same physical constitution as AM50, a 50th percentile dummy of an American adult male and that a seat position of the driver's seat 7 (FIG. 4), on which the driver is seated, is set to such a position that the driver corresponding to AM50 can take an appropriate driving posture.

As illustrated in FIG. 11, in the side view, the first virtual viewpoint V1 is set to be located on a first inclined line L1 that runs through the first target position T1 on the road surface and the driver's eyepoint E and to be shifted in a vehicle front direction from the eyepoint E by a distance dv. In other words, the first virtual viewpoint V1 is set to be located above and in front of the driver's eyepoint E in the cabin. In the side view illustrated in FIG. 4, the first virtual viewpoint V1, which is set at such a position, is located near a position below a roof panel 8 in an area in front of a seat back 7a of the driver's seat 7. Here, the distance dv in the longitudinal direction from the eyepoint E to the first virtual viewpoint V1 can be set to approximately 200 mm, for example.

Next, the image processing unit 3 (the image conversion section 33) sets the projection surface P that is used when the rear-view image is generated in step S15, which will be described below (step S13). As it has already been described with reference to FIG. 5, the projection surface P is the bowl-shaped projection surface including the vehicle and includes the plane projection surface P1 and the stereoscopic projection surface P2. In this embodiment, a center of the projection surface P (the plane projection surface P1) in the plan view matches the vehicle center C (the center in the longitudinal direction and a vehicle width direction of the vehicle) illustrated in FIG. 10A. That is, in step S13, the image processing unit 3 (the image conversion section 33) sets the circular plane projection surface P1 that has the same center as the vehicle center C, and sets the stereoscopic projection surface P2 that is elevated from the outer circumference of this plane projection surface P1 while the diameter thereof is increased with a specified curvature. In addition, as illustrated in FIG. 11, a radius of the plane projection surface P1 is set such that the first target position T1 is located near the outer circumference of the plane projection surface P1 (in other words, a lower edge of the stereoscopic projection surface P2). More specifically, in this embodiment, the radius of the plane projection surface P1 is set to approximately 4 to 5 m such that the first target position T1 exists at a position that is slightly shifted rearward (for example, approximately 200 mm) from a rear end of the outer circumference of the plane projection surface P1 (the lower edge of the stereoscopic projection surface P2).

Figure 15:
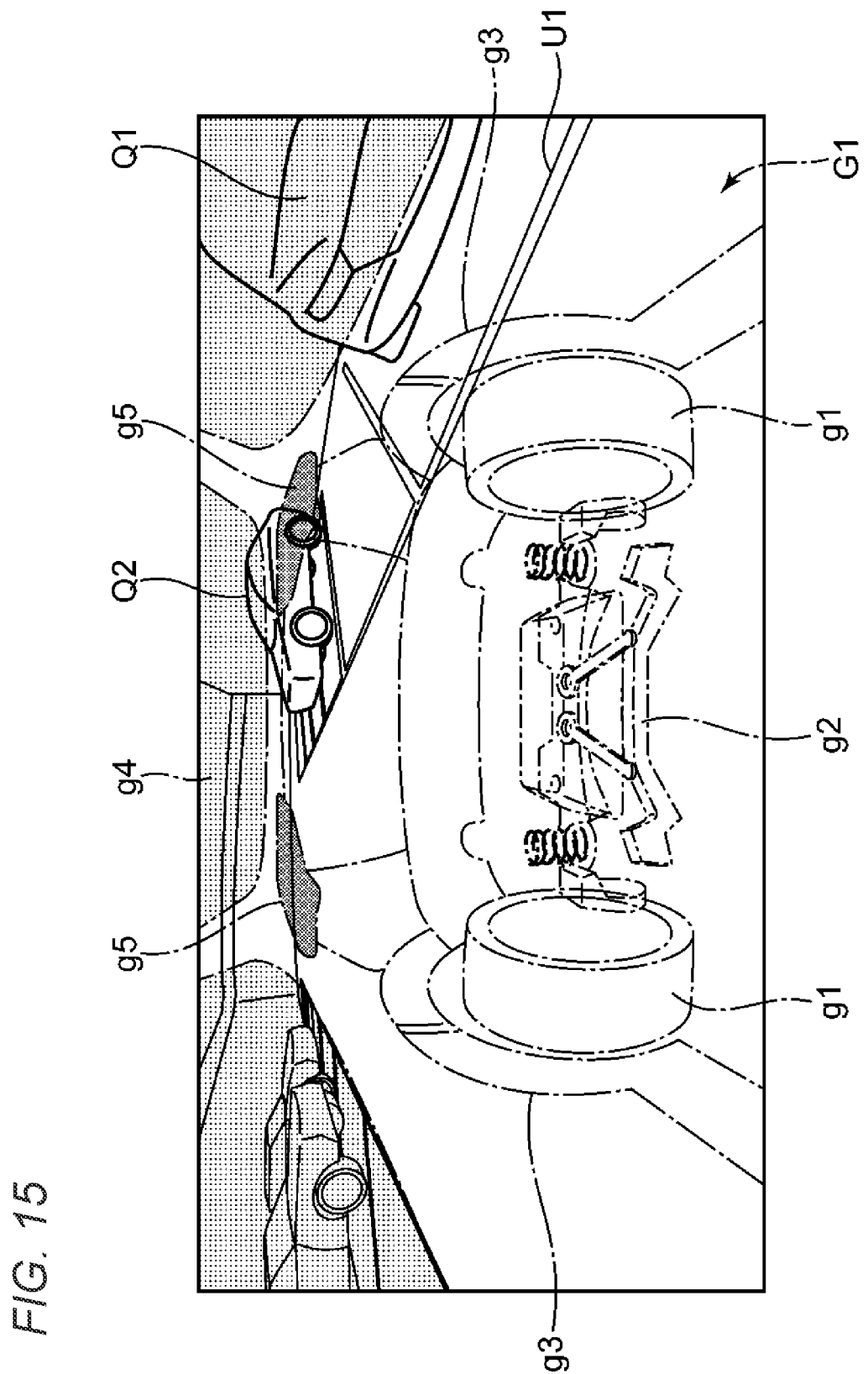
FIG. 15 is a view illustrating an example of the rear-view image.

Next, the image processing unit 3 (the icon setting section 34) sets the first vehicle icon G1 (FIG. 15) that is superimposed on the rear-view image and shown therewith in step S16, which will be described below (step S14). As illustrated in FIG. 15, the first vehicle icon G1, which is set herein, is an icon representing the various components of the vehicle, and such components appear when the area behind the vehicle is seen from the first virtual viewpoint V1. The first vehicle icon G1 includes the graphic image that shows a rear wheel g1 of the vehicle and contour components (a rear fender g3 and the like) in the rear portion of the vehicle in the transmissive state. Such a first vehicle icon G1 can be generated by magnifying or minifying the graphic image, which is stored in the image processing unit 3 in advance, at a scale defined from a positional relationship between the first virtual viewpoint V1 and the projection surface P.

Next, the image processing unit 3 (the image conversion section 33) synthesizes the images that are captured by the cameras 2b, 2c, 2d and acquired in step S11, and executes the viewpoint conversion processing on the synthesized image by using the first virtual viewpoint V1 and the projection surface P set in steps S12, S13, so as to generate the rear-view image that is acquired when the area behind the vehicle is seen from the first virtual viewpoint V1 (step S15). That is, the image processing unit 3 (the image conversion section 33) synthesizes the image of the first area W11 captured by the rear camera 2b, the image of the second area W12 captured by the left camera 2c, and the image of the third area W13 captured by the right camera 2d (see FIG. 10A for each of the areas). Then, the image processing unit 3 (the image conversion section 33) executes the viewpoint conversion processing to project this synthesized image to a rear area P1w that is a part of the rear area of the projection surface P with the first virtual viewpoint V1 as the projection center, that is, an area corresponding to the areas W11 to W13 in the projection surface P (the plane projection surface P1 and the stereoscopic projection surface P2). In this way, it is possible to generate the rear-view image that is acquired when the area behind the vehicle is seen from the first virtual viewpoint V1.

Figure 14A:
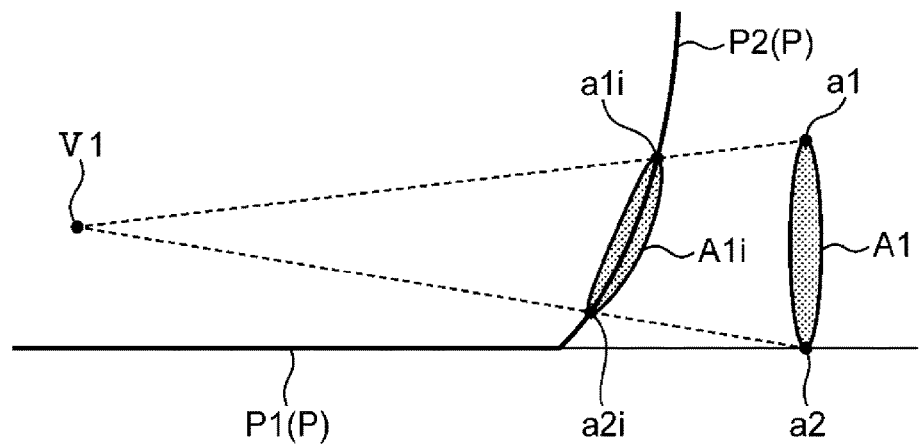
FIGS. 14A-B are schematic views illustrating viewpoint conversion processing, in which 14A illustrates a case where an image of an imaging target, which is farther from the projection surface than the virtual viewpoint, is captured and 14B illustrates a case where an image of an imaging target, which is closer to the virtual viewpoint than the projection surface, is captured.
Figure 14B:
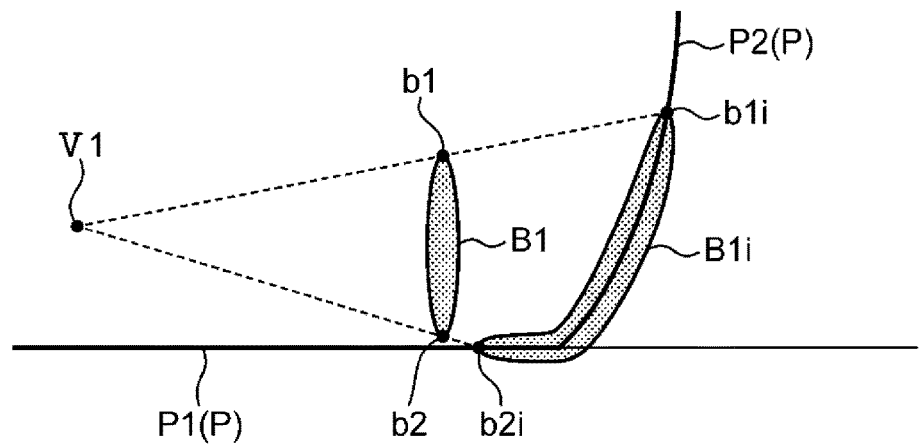

The above-described processing of viewpoint conversion (projection to the projection surface P) can be executed as follows, for example. First, three-dimensional coordinates (X, Y, Z) are defined for each pixel of the synthesized camera image. Next, the coordinates of each of the pixels are converted into projected coordinates by using a specified calculation formula, which is defined by a positional relationship between the first virtual viewpoint V1 and the rear area P1w of the projection surface P, and the like. For example, as illustrated in FIG. 14A, an image A1 is acquired by capturing an image of an imaging target that is farther from the first virtual viewpoint V1 than the projection surface P. When coordinates of particular pixels in this image A1 are a1, a2, projected coordinates of such pixels are a1i, a2i on the projection surface P, respectively. On the contrary, as illustrated in FIG. 14B, an image B1 is acquired by capturing an image of an imaging target that is closer to the first virtual viewpoint V1 than the projection surface P. When coordinates of particular pixels in this image B1 are b1, b2, projected coordinates of such pixels are b1i, b2i on the projection surface P, respectively. Then, the captured image is processed on the basis of such a relationship between the converted coordinate and the original coordinate. For example, in the case of FIG. 14A, the image A1 of the imaging target is processed and converted into the image A1i. In the case of FIG. 14B, the image B1 of the imaging target is processed and converted into the image B1i. The image processing unit 3 (the image conversion section 33) executes the processing of viewpoint conversion (projection to the projection surface P) by the procedure as described so far, and thereby generates the rear-view image that is acquired when the area behind the vehicle is seen from the first virtual viewpoint V1.

Next, the image processing unit 3 (the display control section 35) causes the in-vehicle display 4 to show the rear-view image, which is generated in step S15, in a state where the first vehicle icon G1 set in step S14 is superimposed thereon (step S16). FIG. 15 is a view schematically illustrating an example of the display. In this example, the rear-view image includes: an image of parked vehicles (other vehicles) Q1, Q2 that are located behind the vehicle; and an image of white lines U1 that are provided to the road surface in order to set parking spaces. The first vehicle icon G1 includes a graphic image that shows, in the transmissive state, the left and right rear wheels g1, g1, suspension components g2, the rear fenders g3, g3 located around respective rear wheels g1, g1, rear glass g4, and left and right rear lamps g5. Of these components, the rear fenders g3, g3 are components that define the outermost contour of the rear portion of the vehicle (a surface located on the outermost side in the vehicle width direction).

Next, a detailed description will be made on front-view image generation/display control that is executed in above-described step S8 (FIG. 6) with reference to FIG. 8. When the control illustrated in FIG. 8 is started, the image processing unit 3 (the image extraction section 32) acquires image data of the required range from the images captured by the front camera 2a, the left camera 2c, and the right camera 2d (step S21).

Figure 12A:
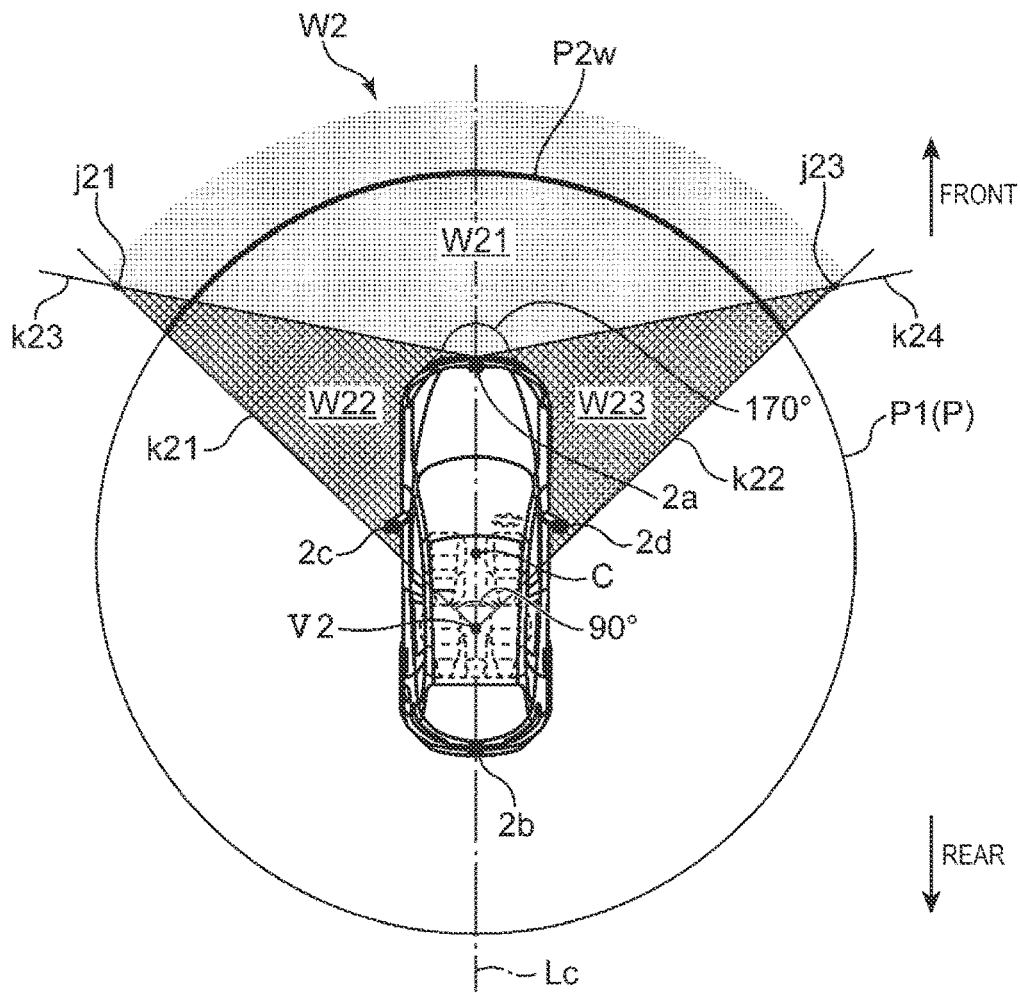
FIGS. 12A-B are views illustrating a range of image data that is used when the front-view image is generated, in which 12A is a plan view and 12B is a side view.
Figure 12B:
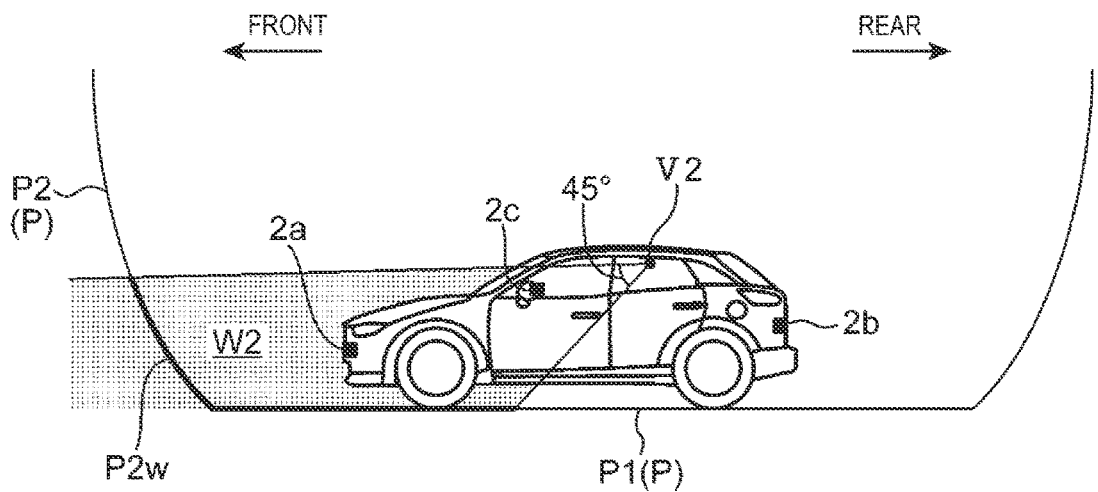

FIGS. 12A and 12B are schematic views for illustrating the range of the image data acquired in step S21, and illustrate the vehicle and the projection surface P therearound in a plan view and a side view, respectively. As it has already been described, the front-view image is the image that is acquired by projecting the camera image to the front area within the angular range of 90 degrees in the horizontal direction and 45 degrees in the perpendicular direction with the second virtual viewpoint V2 being the projection center. Accordingly, the image data that is required to acquire such a front-view image is image data of an imaging area W2 in a three-dimensional fan shape that at least expands forward at angles of 90 degrees in the horizontal direction and 45 degrees in the perpendicular direction from the second virtual viewpoint V2. Thus, in step S21, data that corresponds to the image within the imaging area W2 is acquired from the data of each of the images captured by the front camera 2a, the left camera 2c, and the right camera 2d.

A method for acquiring the image within the front imaging area W2 in step S21 is similar to the method in above-described step S11 (FIG. 7), that is, the method for acquiring the image within the rear imaging area W1 (FIG. 10). Thus, in step S21, as illustrated in FIG. 12A, in a plan view, a fan-shaped area that expands forward with the horizontal angular range of 90 degrees (45 degrees each to the left and right of the vehicle center axis Lc) from the second virtual viewpoint V2, that is, a fan-shaped area that is defined by a first line k21 and a second line k22 is defined as the imaging area W2, the first line k21 extends forward to the left at an angle of 45 degrees from the second virtual viewpoint V2, and the second line k22 extends forward to the right at an angle of 45 degrees from the second virtual viewpoint V2. Then, this imaging area W2 is divided into three areas W21 to W23 in the plan view, and image data of the areas W21 to W23 is acquired from the different cameras. When the area W21, the area W22, the area W23 are set as a first area, a second area, and a third area, respectively, in this embodiment, image data of the first area W21 is acquired from the front camera 2a, image data of the second area W22 is acquired from the left camera 2c, and image data of the third area W23 is acquired from the right camera 2d.

More specifically, of the above-described imaging area W2 (the area defined by the first line k21 and the second line k22), the first area W21 is an area overlapping a fan-shaped area that expands forward with a horizontal angular range of 170 degrees (85 degrees each to the left and right of the vehicle center axis Lc) from the front camera 2a. In other words, the first area W21 is an area defined by a third line k23 that extends forward to the left at an angle of 85 degrees from the front camera 2a, a fourth line k24 that extends forward to the right at an angle of 85 degrees from the front camera 2a, a portion of the first line k21 that is located in front of a point of intersection j21 with the third line k23, and a portion of the second line k22 that is located in front of a point of intersection j22 with the fourth line k24. The second area W22 is a remaining area after the first area W21 is removed from a left half portion of the imaging area W2. The third area W23 is a remaining area after the first area W21 is removed from a right half portion of the imaging area W2. Of the second and third areas W22, W23, areas immediately in front of the vehicle are areas, images of which cannot be captured by the left and right cameras 2c, 2d, respectively. However, the images of these areas are compensated by specified interpolation processing (for example, processing to stretch an image of an adjacent area to each of such areas).

After the image of the required range is acquired from each of the cameras 2a, 2c, 2d, just as described, the image processing unit 3 (the image conversion section 33) sets the second virtual viewpoint V2 that is used when the front-view image is generated in step S25, which will be described below (step S22). As illustrated in FIG. 4 and FIG. 12A, the second virtual viewpoint V2 is set at a position included in the cabin and at a position that matches the vehicle center axis Lc in the plan view and is shifted rearward from the driver's head D1 in the side view.

Figure 13:
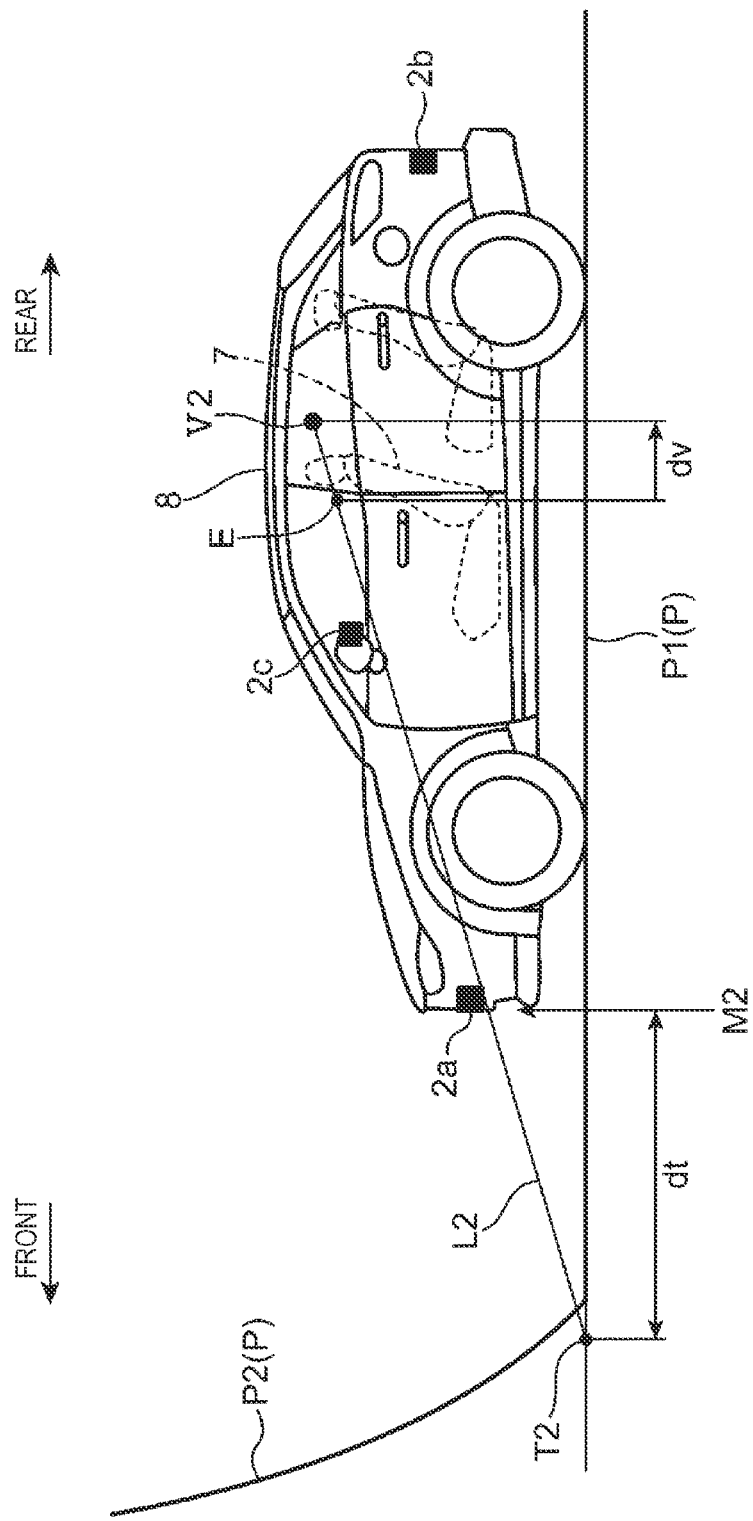
FIG. 13 is a side view for illustrating a position of the second virtual viewpoint that is used when the front-view image is generated.

A description will be made on the detailed position of the second virtual viewpoint V2 with reference to FIG. 13. In FIG. 13, a point T2 is a point on the road surface (further precisely, on the virtual road surface that is made flush with the plane projection surface P1) that is separated from a front end M2 of the vehicle by the distance dt (for example, 2 m) that corresponds to a braking distance during the slow travel (when the vehicle speed is 5 km/h), and this will hereinafter be referred to as a second target position.

As illustrated in FIG. 13, in the side view, the second virtual viewpoint V2 is set to be located on a second inclined line L2 that runs through a second target position T2 on the road surface and the driver's eyepoint E and to be shifted in a vehicle rear direction from the eyepoint E by the distance dv (for example, 200 mm). In other words, the second virtual viewpoint V2 is set to be located above and behind the driver's eyepoint E in the cabin. In the side view illustrated in FIG. 4, the second virtual viewpoint V2, which is set at such a position, is located near the position below the roof panel 8 in an area behind the seat back 7a of the driver's seat 7.

Next, the image processing unit 3 (the image conversion section 33) sets the projection surface P that is used when the front-view image is generated in step S25, which will be described below (step S23). This projection surface P is the same as the projection surface P (above step S13) that is used when the rear-view image, which has already been described, is generated. This projection surface P includes: the circular plane projection surface P1 that has the same center as the vehicle center C; and the stereoscopic projection surface P2 that is elevated from the outer circumference of the plane projection surface P1 while the diameter thereof is increased with the specified curvature. In addition, as illustrated in FIG. 13, the second target position T2 is located near the outer circumference of the plane projection surface P1 (in other words, the lower edge of the stereoscopic projection surface P2). More specifically, the second target position T2 is set at the position that is slightly shifted to the front (for example, approximately 200 mm) from a front end of the outer circumference of the plane projection surface P1 (the lower edge of the stereoscopic projection surface P2).

Next, the image processing unit 3 (the icon setting section 34) sets the second vehicle icon G2 (FIG. 16) that is superimposed on the front-view image and sh therewith in step S26, which will be described below (step S24). As illustrated in FIG. 16, the second vehicle icon G2, which is set herein, is an icon representing the various components of the vehicle, and such components appear when the area in front of the vehicle is seen from the virtual viewpoint V. The second vehicle icon G2 includes the graphic image that shows a front wheel g11 of the vehicle and contour components (a front fender g13 and the like) in the front portion of the vehicle in the transmissive state. Such a second vehicle icon G2 can be generated by magnifying or minifying the graphic image, which is stored in the image processing unit 3 in advance, at a scale defined from a positional relationship between the second virtual viewpoint V2 and the projection surface P.

Next, the image processing unit 3 (the image conversion section 33) synthesizes the images that are captured by the cameras 2a, 2c, 2d and acquired in step S21, and executes the viewpoint conversion processing on the synthesized image by using the second virtual viewpoint V2 and the projection surface P set in steps S22, S23, so as to generate the front-view image that is acquired when the area in front of the vehicle is seen from the second virtual viewpoint V2 (step S25). That is, the image processing unit 3 (the image conversion section 33) synthesizes the image of the first area W21 captured by the front camera 2a, the image of the second area W22 captured by the left camera 2c, and the image of the third area W23 captured by the right camera 2d (see FIG. 12A for each of the areas). Then, the image processing unit 3 (the image conversion section 33) executes the viewpoint conversion processing to project this synthesized image to a front area P2w that is a part of the front area of the projection surface P with the second virtual viewpoint V2 as the projection center, that is, an area corresponding to the areas W21 to W23 in the projection surface P (the plane projection surface P1 and the stereoscopic projection surface P2). In this way, it is possible to generate the front-view image that is acquired when the area in front of the vehicle is seen from the second virtual viewpoint V2. Here, since details of the viewpoint conversion processing are the same as those at the time of generating the rear-view image, which has already been described, the description thereon will not be made herein.

Next, the image processing unit 3 (the display control section 35) causes the in-vehicle display 4 to show the front-view image, which is generated in step S25, in a state where the second vehicle icon G2 set in step S24 is superimposed thereon (step S26). FIG. 16 is a view schematically illustrating an example of the display. In this example, the front-view image includes: an image of parked vehicles (other vehicles) Q11, Q12 that are located in front of the vehicle; and an image of white lines U11 that are provided to the road surface in order to set the parking spaces. The second vehicle icon G2 includes a graphic image that shows, in the transmissive state, the left and right front wheels g11, g11, suspension components g12, the front fenders g13, g13 located around the respective front wheels g11, g11, a front grille g14, and front windshield g15. Of these components, the front fenders g13, g13 are components that define the outermost contour of the front portion of the vehicle (the surface located on the outermost side in the vehicle width direction).

(4) Operational Effects

As it has already been described so far, in this embodiment, on the basis of the images captured by the vehicle exterior imaging device 2 (the cameras 2a to 2d), it is possible to generate the rear-view image, which is the image acquired when the area behind the vehicle is seen from the first virtual viewpoint V1 in the cabin, and the front-view image, which is the image acquired when the area in front of the vehicle is seen from the second virtual viewpoint V2 that is located behind the first virtual viewpoint V1 in the cabin. The in-vehicle display 4 shows the rear-view image at the time when the vehicle travels backward, and shows the front-view image when the vehicle travels forward. The rear-view image and the front-view image are shown at the mutually same angle of view (at the angles of 90 degrees in the horizontal direction and 45 degrees in the perpendicular direction). Such a configuration has advantage that the rear/front-view images of the necessary and sufficient range including the blind areas can be shown in a mode with superior visibility.

That is, in the above embodiment, when the vehicle travels backward, the in-vehicle display 4 shows the rear-view image as the image acquired when the area behind the vehicle is seen from the first virtual viewpoint V1, which is located relatively on the front side in the cabin. Accordingly, it is possible to acquire, as the rear-view image, such an image that the area behind the vehicle is seen from a far position in bird's-eye view, and it is possible to show the necessary and sufficient range that includes the blind areas existing near the left and right sides of the rear portion of the vehicle by the rear-view image. In this way, in a scene where a collision of the vehicle during the reverse travel with an obstacle (such as another vehicle, a pedestrian, or the like) is concerned, such as a time when the driver performs a driving operation of the vehicle for reverse parking, the driver can accurately recognize the obstacle, which the driver is likely to miss, in a rear lateral area (the blind area) of the vehicle. Thus, it is possible to assist the driver to perform safe driving capable of avoiding the collision (involvement) with such an obstacle.

Similarly, when the vehicle travels forward, the in-vehicle display 4 shows the front-view image as the image acquired when the area in front of the vehicle is seen from the second virtual viewpoint V2, which is located relatively on the rear side in the cabin. Accordingly, it is possible to acquire, as the front-view image, such an image that the area in front of the vehicle is seen from the far position in the bird's-eye view, and it is possible to show the necessary and sufficient range that includes the blind areas existing near the left and right sides of the front portion of the vehicle by the front-view image. In this way, in a scene where the collision of the vehicle during the forward travel with the obstacle (such as the other vehicle, the pedestrian, or the like) is concerned, such as a time when the driver performs the driving operation of the vehicle for forward parking, the driver can accurately recognize the obstacle, which the driver is likely to miss, in a front lateral area (the blind area) of the vehicle. Thus, it is possible to assist the driver to perform safe driving capable of avoiding the collision (the involvement) with such an obstacle.

In addition, since the angles of view of the rear-view image and the front-view image are unified, it is possible to favorably secure the visibility of both of the view images. For example, in the case where the angle of view significantly differs between the rear-view image and the front-view image, the driver feels a sense of discomfort when the view image is switched from the rear-view image to the front-view image (or vice versa), and thus the driver may not understand the image after switching instantaneously. On the contrary, according to the above embodiment in which the angles of view of the rear-view image and the front-view image are unified, it is possible to avoid generation of such a sense of discomfort and thus to make the driver instantaneously understand each of the view images.

In the above embodiment, the first virtual viewpoint V1 is set to be located above and in front of the eyepoint E of the driver who is seated on the driver's seat 7, and the second virtual viewpoint V2 is set to be located above and behind the eyepoint E. Accordingly, it is possible to show each of the view images in a direction close to a direction of the driver's eye line. Thus, the driver can easily recognize each of the view images intuitively.

In the above embodiment, in the side view, the first virtual viewpoint V1 is set on the first inclined line L1 running through the first target position T1, which is separated from the rear end M1 of the vehicle by the distance dt corresponding to the braking distance during the slow travel, on the road surface and the driver's eyepoint E. Accordingly, for example, the driver who performs the operation of the vehicle for the reverse parking can accurately recognize the obstacle at the first target position T1. Thus, it is possible to reduce a possibility of the collision with the obstacle. That is, even in the case where the obstacle exists at the first target position T1 when the driver performs the operation for the reverse parking, due to the separation of the vehicle from the obstacle by the braking distance during the slow travel, the collision with the obstacle can be avoided somehow by a brake operation by the driver. To put it the other way around, it can be said that the first target position T1 is a position to which the driver should pay attention in order to reliably recognize the existing obstacle and thus is an important position to avoid the collision. Meanwhile, according to the above embodiment, in which the first virtual viewpoint V1 is set on the first inclined line L1 as described above, the similar image to the image that is shown when the driver actually changes a direction of the eye line to the first target position T1 is shown as the rear-view image. As a result, the driver can accurately recognize the obstacle that exists at the first target position T1 through the rear-view image. Thus, it is possible to reduce the possibility of the collision with the obstacle.

Similarly, in the above embodiment, in the side view, the second virtual viewpoint V2 is set on the second inclined line L2 running through the second target position T2, which is separated from the front end M2 of the vehicle by the distance dt (the braking distance during the slow travel), on the road surface and the driver's eyepoint E. Accordingly, for example, the driver who performs the operation of the vehicle for the forward parking can accurately recognize the obstacle at the second target position T2 through the front view image which is seen from the second virtual viewpoint V2. Thus, it is possible to reduce the possibility of the collision with the obstacle.

In the above embodiment, the camera image is projected on the projection surface P (the plane projection surface P1 and the stereoscopic projection surface P2) with one of the first and second virtual viewpoint V1, V2 as the projection center at the time when respective one of the rear-view image and the front-view image is generated. Each of the first target position T1 and the second target position T2 is set to be located near the lower edge of the stereoscopic projection surface P2 (the outer circumference of the plane projection surface P1). Accordingly, when the obstacle exists at each of the target positions T1, T2, it is possible to show the image of the obstacle in the state of being projected mainly on the stereoscopic projection surface P2. Thus, it is possible to further improve the visibility of the obstacle on each of the target positions T1, T2. That is, as illustrated in FIG. 14B, compared to the image that is projected on the plane projection surface P1 and is easily and significantly distorted, the image that is projected on the stereoscopic projection surface P2 is slightly distorted, and thus has the superior visibility. Accordingly, in the case where it is configured to project the image of the obstacle at each of the target positions T1, T2 mainly on the stereoscopic projection surface P2, it is possible to improve the visibility of the obstacle. Thus, it is possible to further reduce the possibility of the collision with the obstacle.

In the above embodiment, the first vehicle icon G1, which shows a group of the components in the rear portion of the vehicle in the transmissive state, is superimposed on the rear-view image and is shown therewith. The second vehicle icon G2, which shows a group of the components in the front portion of the vehicle in the transmissive state, is superimposed on the front-view image and is shown therewith. Accordingly, the driver can recognize the information on the obstacle, which is shown in each of the view images, and the like while comprehending the positional relationship with the vehicle. In addition, the first vehicle icon G1 includes the image of the component (the rear fender g3) that defines the outermost contour of the rear portion of the vehicle. The second vehicle icon G2 includes the image of the component (the front fender g13) that defines the outermost contour of the front portion of the vehicle. Accordingly, the driver can accurately recognize the positional relationship between the obstacle that exists in the rear lateral area or the front lateral area of the vehicle and a component having a possibly of being the first to collide with the obstacle. Thus, it is possible to further reduce the possibility of the collision with the obstacle.

(5) Modified Embodiments

In the above embodiment, the horizontal angle of view of each of the rear-view image and the front-view image is set to the same 90 degrees as the maximum horizontal angle θ1 (=90 degrees) of the stable visual field during gazing of the person. However, in consideration of a certain degree of individual variation in breadth of the stable visual field during gazing, the horizontal angle of view of each of the view images may be a value that is slightly offset from 90 degrees. In other words, the horizontal angle of view of each of the view images only needs to be 90 degrees or a value near 90 degrees (approximately 90 degrees), and thus can be set to an appropriate value within a range between 85 degrees and 95 degrees, for example.

In the above embodiment, the perpendicular angle of view of each of the rear-view image and the front-view image is set to 45 degrees. However, the perpendicular angle of view of each of the view images only needs to be equal to or smaller than the maximum perpendicular angle θ2 (=70 degrees) of the stable visual field during gazing of the person and equal to or larger than 40 degrees. That is, the perpendicular angle of view of each of the rear-view image and the front-view image can be set to an appropriate value within a range between 40 degrees and 70 degrees.

In the above embodiment, the angles of view of the rear-view image and the front-view image are set to be the same (90 degrees in the horizontal direction and 45 degrees in the perpendicular direction). However, the angles of view of both of the view images do not have to be exactly the same, and may slightly differ from each other. More specifically, when a difference in the angle of view between the rear-view image and the front-view image is equal to or smaller than five degrees, it can be said that the angles of view of both of the view images are substantially the same, and the present disclosure includes such an aspect.

In the above embodiment, the center of the projection surface P, on which the camera image is projected at the time of generating the rear-view image and the front-view image, matches the vehicle center C in the plan view. However, the projection surface P only needs to be set to include the vehicle, and thus the center of the projection surface P may be set to a position shifted from the vehicle center C. For example, the center of the projection surface P may match the first virtual viewpoint V1 or the second virtual viewpoint V2. Further in detail, the projection surface with the first virtual viewpoint V1 being the center may be set at the time of generating the rear-view image, and the projection surface with the second virtual viewpoint V2 being the center may be set at the time of generating the front-view image.

In the above embodiment, the radius of the plane projection surface P1 is set such that the first target position T1 and the second target position T2 are located slightly outward (on the side separated from the vehicle) from the lower edge of the stereoscopic projection surface P2 (the outer circumference of the plane projection surface P1) in the projection surface P. The first target position T1 is separated from the rear end M1 of the vehicle by the distance dt (for example, 2 m) corresponding to the braking distance during the slow travel, and the second target position T2 is separated from the front end M2 of the vehicle by the same distance dt. However, each of the target positions T1, T2 only needs to be located near the lower edge of the stereoscopic projection surface P2, and can be changed to any of various positions as long as such a condition is satisfied. For example, each of the target positions T1, T2 may be located at a position that corresponds to the lower edge of the stereoscopic projection surface P2, or may be located at a position that is slightly separated inward (to the side closer to the vehicle) from the lower edge of the stereoscopic projection surface P2. A distance between each of the target positions T1, T2 and the lower edge of the stereoscopic projection surface P2 is permitted to ±50 cm. In other words, it can be said that each of the target positions T1, T2 is located near the lower edge of the stereoscopic projection surface P2 as long as such a distance is equal to or shorter than ±50 cm.

What is claimed is:

1. A vehicular display system that is mounted on a vehicle to show an image of a surrounding area of the vehicle, the vehicular display system comprising:
    an imaging unit that captures the image of the surrounding area of the vehicle;
    an image processing unit that converts the image captured by the imaging unit into a view image that is an image of the surrounding area of the vehicle seen from inside of a cabin; and
    a display unit that shows the view image generated by the image processing unit, wherein
    the image processing unit can generate, as the view image, a rear-view image and a front-view image, the rear-view image being acquired when an area behind the vehicle is seen from a first virtual viewpoint located in the cabin, and the front-view image being acquired when an area in front of the vehicle is seen from a second virtual viewpoint that is located behind the first virtual viewpoint in the cabin,
    the display unit shows the rear-view image when the vehicle travels backward, shows the front-view image when the vehicle travels forward, and shows both of the view images at substantially the same angle of view,
    the first virtual viewpoint is set at a position above and in front of an eyepoint of a driver who is seated on a driver's seat, and the second virtual viewpoint is set at a position above and behind the driver's eyepoint,
    in a side view, the first virtual viewpoint is set on a first inclined line that runs through a first target position on a road surface and the driver's eyepoint, the first target position being separated from a rear end of the vehicle by a braking distance during slow travel, and
    in the side view, the second virtual viewpoint is set on a second inclined line that runs through a second target position on the road surface and the driver's eyepoint, the second target position being separated from a front end of the vehicle by the braking distance during the slow travel.

2. The vehicular display system according to claim 1, wherein
    the image processing unit generates the first view image or the second view image by projecting the image captured by the imaging unit on a predetermined virtual projection surface with the first virtual viewpoint or the second virtual viewpoint as a projection center, the projection surface has: a plane projection surface that is set on the road surface; and a stereoscopic projection surface that is elevated from an outer circumference of the plane projection surface, and the first target position and the second target position are set to be located near a lower edge of the stereoscopic projection surface.

3. The vehicular display system according to claim 2, wherein the image processing unit superimposes a first simulated image, which represents a group of components in a rear portion of the vehicle, on the rear-view image in a transmissive state and shows the first simulated image with the rear-view image, and superimposes a second simulated image, which represents a group of components in a front portion of the vehicle, on the front-view image in the transmissive state and shows the second simulated image with the front-view image, the first simulated image includes an image of a component that defines an outermost contour of the rear portion of the vehicle, and the second simulated image includes an image of a component that defines an outermost contour of the front portion of the vehicle.

4. The vehicular display system according to claim 1, wherein the image processing unit superimposes a first simulated image, which represents a group of components in a rear portion of the vehicle, on the rear-view image in a transmissive state and shows the first simulated image with the rear-view image, and superimposes a second simulated image, which represents a group of components in a front portion of the vehicle, on the front-view image in the transmissive state and shows the second simulated image with the front-view image, the first simulated image includes an image of a component that defines an outermost contour of the rear portion of the vehicle, and the second simulated image includes an image of a component that defines an outermost contour of the front portion of the vehicle.

5. The vehicular display system according to claim 1, wherein a horizontal angle of view of each of the front-view image and the rear-view image is approximately 90 degrees.

6. The vehicular display system according to claim 1, wherein a perpendicular angle of view of each of the front-view image and the rear-view image is between 40 degrees and 70 degrees.

* * * * *